US012041317B2

(12) United States Patent
Kareeson et al.

(10) Patent No.: US 12,041,317 B2
(45) Date of Patent: *Jul. 16, 2024

(54) MERGING PERMISSIONS AND CONTENT OUTPUT

(71) Applicant: Comcast Cable Communications, LLC, Philadelphia, PA (US)

(72) Inventors: Tyler Kareeson, Sunnyvale, CA (US); Scott Eklund, San Jose, CA (US); Francisco Niebres, San Francisco, CA (US); Preston Smalley, Danville, CA (US); Josh Kennedy, Sunnyvale, CA (US); Donald J. Stecher, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/176,221

(22) Filed: Feb. 28, 2023

(65) Prior Publication Data
US 2023/0239544 A1    Jul. 27, 2023

Related U.S. Application Data

(63) Continuation of application No. 17/510,694, filed on Oct. 26, 2021, now Pat. No. 11,622,160, which is a (Continued)

(51) Int. Cl.
*H04N 21/65* (2011.01)
*G06Q 20/12* (2012.01)
(Continued)

(52) U.S. Cl.
CPC ....... *H04N 21/658* (2013.01); *G06Q 20/1235* (2013.01); *G06Q 20/3224* (2013.01);
(Continued)

(58) Field of Classification Search
CPC ............ H04N 21/658; H04N 21/4627; H04N 21/4367; H04N 21/4524; H04N 21/812;
(Continued)

(56) References Cited

U.S. PATENT DOCUMENTS 5,828,945 A * 10/1998 Klosterman ........... H04N 7/163
                                                   348/569
5,850,218 A * 12/1998 LaJoie ................... H04N 7/165
                                                   348/E7.071
(Continued)

FOREIGN PATENT DOCUMENTS

CA         2744790 A1     1/2012
GB         1492260 A     11/1977
(Continued)

OTHER PUBLICATIONS

U.S. Appl. No. 17/493,415, User Location and Identity Awareness, filed Oct. 4, 2021.
(Continued)

*Primary Examiner* — Timothy R Newlin
(74) *Attorney, Agent, or Firm* — Banner & Witcoff, Ltd.

(57) ABSTRACT

Aspects of the disclosure relate to determining that a wireless device associated with one user account is proximate to a computing device associated with another user account. In response to determining the proximity of the two devices, one or more of the devices may receive merged access to permissions and/or content associated with the two user accounts. In response to determining that the wireless device is not proximate to the computing device, the devices may no longer receive merged access to permissions and/or content associated with the two user accounts.

56 Claims, 8 Drawing Sheets

Related U.S. Application Data continuation of application No. 16/008,350, filed on Jun. 14, 2018, now Pat. No. 11,197,072, which is a continuation of application No. 14/456,601, filed on Aug. 11, 2014, now Pat. No. 10,045,090.

(51) Int. Cl.
| | | |
|---|---|---|
| *G06Q 20/32* | (2012.01) | |
| *G06Q 30/0207* | (2023.01) | |
| *G06Q 30/0241* | (2023.01) | |
| *G06Q 30/0601* | (2023.01) | |
| *H04N 21/4367* | (2011.01) | |
| *H04N 21/45* | (2011.01) | |
| *H04N 21/4627* | (2011.01) | |
| *H04N 21/658* | (2011.01) | |
| *H04N 21/81* | (2011.01) | |

(52) U.S. Cl.
CPC ..... *G06Q 30/0224* (2013.01); *G06Q 30/0241* (2013.01); *G06Q 30/0631* (2013.01); *H04N 21/4367* (2013.01); *H04N 21/4524* (2013.01); *H04N 21/4627* (2013.01); *H04N 21/812* (2013.01)

(58) Field of Classification Search
CPC .......... G06Q 20/3224; G06Q 20/1235; G06Q 30/0224; G06Q 30/0631; G06Q 30/0241
See application file for complete search history.

(56) References Cited

U.S. PATENT DOCUMENTS

| | | | |
|---|---|---|---|
| 6,486,892 B1* | 11/2002 | Stern | G06F 3/0484 |
| | | | 715/729 |
| 6,493,878 B1 | 12/2002 | Kassatly | |
| 6,526,577 B1* | 2/2003 | Knudson | H04N 21/482 |
| | | | 725/39 |
| 7,221,961 B1* | 5/2007 | Fukumoto | G06F 1/263 |
| | | | 455/418 |
| 7,386,869 B1 | 6/2008 | Bastien et al. | |
| 7,502,619 B1 | 3/2009 | Katz | |
| 7,921,071 B2 | 4/2011 | Hicks | |
| 8,089,946 B2 | 1/2012 | Brommer | |
| 8,139,704 B2 | 3/2012 | Heinrich | |
| 8,149,748 B2 | 4/2012 | Bata et al. | |
| 8,316,088 B2 | 11/2012 | Jalava et al. | |
| 8,385,942 B1 | 2/2013 | Leung et al. | |
| 8,463,295 B1 | 6/2013 | Caralis et al. | |
| 8,522,294 B2 | 8/2013 | Salinger et al. | |
| 8,528,028 B2 | 9/2013 | Sheth et al. | |
| 8,588,198 B2 | 11/2013 | Salinger | |
| 8,645,801 B2 | 2/2014 | White | |
| 8,655,885 B1 | 2/2014 | Scott et al. | |
| 8,677,502 B2 | 3/2014 | Hanson et al. | |
| 8,705,639 B2 | 4/2014 | Salinger | |
| 8,718,445 B1 | 5/2014 | Berger et al. | |
| 9,043,436 B2* | 5/2015 | Dudek | G06F 21/10 |
| | | | 709/217 |
| 9,084,003 B1* | 7/2015 | Sanio | H04N 21/4222 |
| 9,253,533 B1 | 2/2016 | Morgan et al. | |
| 9,473,548 B1 | 10/2016 | Chakrovorthy et al. | |
| 10,045,090 B2 | 8/2018 | Kareeson | |
| 10,440,499 B2 | 10/2019 | Farrell | |
| 11,070,860 B2 | 7/2021 | Francisco et al. | |
| 11,172,333 B2 | 11/2021 | Farrell | |
| 11,197,072 B2 | 12/2021 | Kareeson | |
| 11,622,160 B2 | 4/2023 | Kareeson | |
| 11,750,896 B1* | 9/2023 | Mahto | H04N 21/4316 |
| | | | 725/34 |
| 2002/0142722 A1 | 10/2002 | Gutta et al. | |
| 2002/0162121 A1 | 10/2002 | Mitchell | |
| 2003/0188316 A1* | 10/2003 | DePrez | H04N 21/812 |
| | | | 348/E7.071 |
| 2004/0068744 A1* | 4/2004 | Claussen | H04N 21/4402 |
| | | | 348/192 |
| 2004/0117269 A1* | 6/2004 | Karaoguz | H04N 21/422 |
| | | | 348/E7.071 |
| 2004/0203374 A1* | 10/2004 | Zilliacus | H04N 21/4882 |
| | | | 348/E5.002 |
| 2005/0066353 A1* | 3/2005 | Fransdonk | H04N 21/2541 |
| | | | 348/E7.056 |
| 2005/0097595 A1* | 5/2005 | Lipsanen | H04L 65/611 |
| | | | 725/62 |
| 2005/0130585 A1* | 6/2005 | Gnuschke | H04N 21/41265 |
| | | | 455/3.06 |
| 2005/0155063 A1* | 7/2005 | Bayrakeri | H04N 21/4348 |
| | | | 348/E7.071 |
| 2005/0232242 A1* | 10/2005 | Karaoguz | H04N 21/4126 |
| | | | 370/352 |
| 2005/0240943 A1 | 10/2005 | Smith et al. | |
| 2005/0277428 A1 | 12/2005 | Nathan Brown | |
| 2006/0025069 A1* | 2/2006 | Benco | H04H 20/24 |
| | | | 455/12.1 |
| 2006/0046709 A1* | 3/2006 | Krumm | H04W 64/00 |
| | | | 455/422.1 |
| 2006/0074494 A1 | 4/2006 | McFarland | |
| 2006/0080716 A1 | 4/2006 | Nishikawa et al. | |
| 2006/0136496 A1* | 6/2006 | Ohashi | H04N 7/163 |
| 2007/0028258 A1* | 2/2007 | Wollmershauser | |
| | | | H04N 21/4882 |
| | | | 348/E7.071 |
| 2007/0061835 A1 | 3/2007 | Klein et al. | |
| 2007/0089148 A1 | 4/2007 | Oh et al. | |
| 2007/0124789 A1* | 5/2007 | Sachson | H04N 21/41265 |
| | | | 348/E7.071 |
| 2007/0154168 A1 | 7/2007 | Cordray et al. | |
| 2007/0174472 A1 | 7/2007 | Kulakowski | |
| 2007/0234213 A1 | 10/2007 | Krikorian et al. | |
| 2007/0299778 A1 | 12/2007 | Haveson et al. | |
| 2008/0077956 A1 | 3/2008 | Morrison et al. | |
| 2008/0109307 A1* | 5/2008 | Ullah | H04N 21/2668 |
| | | | 705/14.66 |
| 2008/0109843 A1* | 5/2008 | Ullah | H04N 21/812 |
| | | | 725/34 |
| 2008/0115166 A1* | 5/2008 | Bhogal | H04N 21/47214 |
| | | | 348/E5.006 |
| 2008/0134043 A1 | 6/2008 | Georgis et al. | |
| 2008/0168502 A1* | 7/2008 | Trauth | G06Q 30/0631 |
| | | | 725/46 |
| 2008/0263235 A1* | 10/2008 | Hans | H04N 21/835 |
| | | | 710/22 |
| 2008/0279100 A1 | 11/2008 | Yuan et al. | |
| 2008/0319833 A1* | 12/2008 | Svendsen | H04L 69/00 |
| | | | 707/999.005 |
| 2009/0017750 A1* | 1/2009 | Marcinkiewicz | G06Q 30/0277 |
| | | | 455/414.2 |
| 2009/0030931 A1* | 1/2009 | Khivesara | H04N 21/4355 |
| | | | 707/999.102 |
| 2009/0083362 A1* | 3/2009 | Svendsen | H04N 7/17336 |
| | | | 709/224 |
| 2009/0125971 A1* | 5/2009 | Belz | H04N 7/163 |
| | | | 725/153 |
| 2009/0133051 A1 | 5/2009 | Hildreth | |
| 2009/0144629 A1* | 6/2009 | Ferlitsch | H04N 1/00503 |
| | | | 715/736 |
| 2009/0165045 A1* | 6/2009 | Stallings | H04N 21/4312 |
| | | | 725/39 |
| 2009/0216630 A1* | 8/2009 | Carnahan | G06Q 30/02 |
| | | | 705/14.69 |
| 2009/0226046 A1* | 9/2009 | Shteyn | H04N 21/6582 |
| | | | 707/999.1 |
| 2009/0248672 A1 | 10/2009 | McIntire et al. | |
| 2009/0254824 A1 | 10/2009 | Singh | |
| 2009/0260038 A1* | 10/2009 | Acton | H04N 21/482 |
| | | | 725/49 |
| 2009/0265737 A1 | 10/2009 | Issa et al. | |
| 2009/0265742 A1 | 10/2009 | Schwartz et al. | |
| 2009/0276224 A1 | 11/2009 | Medina et al. | |
| 2009/0293018 A1 | 11/2009 | Wilson et al. | |

(56) References Cited

U.S. PATENT DOCUMENTS

| | | | |
|---|---|---|---|
| 2009/0293095 A1* | 11/2009 | Karaoguz | H04N 21/41407 725/119 |
| 2010/0011103 A1* | 1/2010 | Luzzatti | H04L 63/10 709/234 |
| 2010/0107185 A1 | 4/2010 | Shintani | |
| 2010/0115592 A1* | 5/2010 | Belz | G06F 21/10 726/5 |
| 2010/0199295 A1 | 8/2010 | Katpelly et al. | |
| 2010/0254370 A1 | 10/2010 | Jana et al. | |
| 2010/0268955 A1* | 10/2010 | Ohno | H04L 9/0838 713/171 |
| 2010/0306394 A1* | 12/2010 | Brown | H04L 63/0492 709/229 |
| 2010/0325652 A1* | 12/2010 | Lee | H04N 21/632 725/100 |
| 2011/0029610 A1* | 2/2011 | Chao | H04L 67/104 709/204 |
| 2011/0069940 A1 | 3/2011 | Shimy et al. | |
| 2011/0113097 A1 | 5/2011 | Takeuchi | |
| 2011/0113122 A1 | 5/2011 | Drope | |
| 2011/0126251 A1 | 5/2011 | LaFreniere et al. | |
| 2011/0126258 A1 | 5/2011 | Emerson et al. | |
| 2011/0131663 A1 | 6/2011 | Kaikuranta et al. | |
| 2011/0161666 A1 | 6/2011 | Gladwin et al. | |
| 2011/0252132 A1 | 10/2011 | Wetzer et al. | |
| 2011/0292300 A1* | 12/2011 | Nagara | H04N 21/41265 348/734 |
| 2011/0320627 A1 | 12/2011 | Landow et al. | |
| 2012/0011233 A1 | 1/2012 | Dixon et al. | |
| 2012/0011558 A1* | 1/2012 | Maddali | G06Q 30/00 725/131 |
| 2012/0030313 A1 | 2/2012 | McGowan et al. | |
| 2012/0030326 A1 | 2/2012 | Cassidy et al. | |
| 2012/0046054 A1* | 2/2012 | Celik | H04M 1/2757 455/466 |
| 2012/0054233 A1 | 3/2012 | Svendsen et al. | |
| 2012/0054856 A1 | 3/2012 | Johansson | |
| 2012/0060176 A1 | 3/2012 | Chai et al. | |
| 2012/0060182 A1 | 3/2012 | Hardin | |
| 2012/0064923 A1 | 3/2012 | Imes et al. | |
| 2012/0072933 A1 | 3/2012 | Moore | |
| 2012/0117017 A1* | 5/2012 | Phillips | H04N 21/4826 706/50 |
| 2012/0117193 A1 | 5/2012 | Phillips et al. | |
| 2012/0117585 A1 | 5/2012 | Curtis et al. | |
| 2012/0117620 A1* | 5/2012 | Cassidy | H04N 21/2543 726/3 |
| 2012/0136936 A1 | 5/2012 | Quintuna | |
| 2012/0191776 A1 | 7/2012 | Ruffner et al. | |
| 2012/0208466 A1* | 8/2012 | Park | H04N 21/4108 455/41.3 |
| 2012/0240144 A1 | 9/2012 | Rose | |
| 2012/0254347 A1* | 10/2012 | Seetharam | H04N 21/4126 709/217 |
| 2012/0259722 A1 | 10/2012 | Mikurak | |
| 2012/0290434 A1 | 11/2012 | Moritz et al. | |
| 2012/0324550 A1 | 12/2012 | Wasilewski | |
| 2013/0027613 A1* | 1/2013 | Kim | H04N 21/4316 348/563 |
| 2013/0036117 A1 | 2/2013 | Fisher et al. | |
| 2013/0047175 A1 | 2/2013 | Ramirez Flores et al. | |
| 2013/0066908 A1 | 3/2013 | Niranjan | |
| 2013/0132984 A1 | 5/2013 | Walter et al. | |
| 2013/0145385 A1 | 6/2013 | Aghajanyan et al. | |
| 2013/0173765 A1 | 7/2013 | Korbecki | |
| 2013/0183021 A1 | 7/2013 | Osman | |
| 2013/0204825 A1 | 8/2013 | Su | |
| 2013/0263175 A1 | 10/2013 | Diroo et al. | |
| 2013/0268357 A1 | 10/2013 | Heath | |
| 2013/0290848 A1* | 10/2013 | Billings | H04N 21/4621 715/719 |
| 2013/0331087 A1 | 12/2013 | Shoemaker et al. | |
| 2013/0339857 A1 | 12/2013 | Garcia Bailo et al. | |
| 2014/0022920 A1* | 1/2014 | Dua | H04W 64/003 370/252 |
| 2014/0032635 A1* | 1/2014 | Pimmel | H04N 21/44227 709/227 |
| 2014/0040942 A1 | 2/2014 | Ellis et al. | |
| 2014/0066098 A1 | 3/2014 | Stern et al. | |
| 2014/0067828 A1* | 3/2014 | Archibong | H04N 21/84 707/748 |
| 2014/0075575 A1 | 3/2014 | Kim et al. | |
| 2014/0087752 A1 | 3/2014 | Zhu et al. | |
| 2014/0089958 A1 | 3/2014 | Nichols et al. | |
| 2014/0123165 A1 | 5/2014 | Mukherjee et al. | |
| 2014/0172122 A1 | 6/2014 | Ricket | |
| 2014/0176310 A1 | 6/2014 | Kotlicki | |
| 2014/0189720 A1 | 7/2014 | Terrazas | |
| 2014/0223467 A1 | 8/2014 | Hayton et al. | |
| 2014/0232553 A1 | 8/2014 | Venkatraman et al. | |
| 2014/0259047 A1* | 9/2014 | Bakar | G08C 17/02 725/30 |
| 2014/0298386 A1 | 10/2014 | Dasgupta et al. | |
| 2014/0341109 A1 | 11/2014 | Cartmell et al. | |
| 2015/0026317 A1 | 1/2015 | Ilsar et al. | |
| 2015/0065172 A1* | 3/2015 | Do | H04W 12/08 455/456.3 |
| 2015/0067785 A1 | 3/2015 | Donnellan et al. | |
| 2015/0095844 A1* | 4/2015 | Cho | G06F 3/0304 715/784 |
| 2015/0121478 A1* | 4/2015 | Huang | G06F 21/604 726/4 |
| 2015/0181286 A1* | 6/2015 | Gonzalez | H04N 21/41265 725/98 |
| 2015/0193433 A1 | 7/2015 | Dykeman et al. | |
| 2015/0249865 A1 | 9/2015 | Oliveira | |
| 2015/0327060 A1 | 11/2015 | Gilson et al. | |
| 2016/0073143 A1 | 3/2016 | Filev et al. | |
| 2016/0110358 A1 | 4/2016 | Lee | |
| 2018/0084418 A1* | 3/2018 | Walsh | H04W 12/041 |

FOREIGN PATENT DOCUMENTS

| | | |
|---|---|---|
| WO | 0062445 A1 | 10/2000 |
| WO | 0210681 A1 | 2/2002 |
| WO | 2005046257 A2 | 5/2005 |

OTHER PUBLICATIONS

U.S. Appl. No. 18/333,783, User Location and Identity Awareness, filed Jun. 13, 2023.

Don Dodge on the Next Big Thing: Indoor Location startups innovating Indoor Positioning, 5 pages, dated Jun. 19, 2013.

Google Search Appliance Security: Notes from the Field, 41 pages, dated Mar. 2013.

Martin Jan Surminen, et al. Location-based DRM using WiFi Access Points, University of Wollongong Research Online, 2007 International Symposium on Communications and Information Technologies, pp. 880-886.

Daniel Nations. What is AirDrop? How Does It Work? 1 page, retrieved Nov. 26, 2013.

Tile, the world's largest lost and found, 7 pages, retrieved Nov. 26, 2013.

Adena Schutzberg. Ten Things You Need to Know About Indoor Positioning, Directions Magazine, 10 pages, retrieved Nov. 13, 2013.

Yapeng Wang et al. Bluetooth Indoor Positioning using RSSI and Least Square Estimation, 5 pages, 2010.

Günther, André, and Christian Hoene. "Measuring round trip times to determine the distance between WLAN nodes." Networking 2005. Berlin, 2005. p. 1-12.

How to measure distance between two iphone devices using bluetooth? Stack Overflow, retrieved Nov. 13, 2013, 3 pages.

Joonyoung Jung et al. Distance Estimation of Smart Device using Bluetooth. The Eighth International Conference on Systems and Networks Communications, 2013, p. 13-18.

Harold Naumann, M2M Machine to Machine, dated Aug. 28, 2012, 4 pages.

(56) References Cited

OTHER PUBLICATIONS

InSSIDer, Wikipedia, retrieved Nov. 13, 2013, 4 pages.
Kismet (software), Wikipedia, retrieved Nov. 13, 2013, 2 pages.
Daan Scheerens. Practical Indoor Localization using Bluetooth, Jan. 2012, 120 pages.
Liam Boogar, Why Polestar's indoor GPS Technology—10 years in the making—is the future of local commerce, dated Apr. 15, 2013, 3 pages.
Wireshark, Wikipedia retrieved Nov. 13, 2013, 4 pages.
Continuous Indoor Positioning: GNSS: Wi-Fi, and MEMS Dead Reckoning, dated Nov. 1, 2012, 20 pages.
Accurate Mobile Indoor Positioning Industry Alliance, called In-Location, to promote deployment of location-based indoor services and solutions, dated Aug. 23, 2012, 9 pages.
The Ten Commandments of Wireless Communications, B&B Electronics 2009, 6 pages.
Publisher Solutions, Aisle411, 2013, 1 page.
Bluetooth, Wikipedia retrieved Nov. 13, 2013, 23 pages.
Andrei et al. Bluetooth Triangulation, retrieved 2014, 14 pages.
MacRumors Forum, retrieved Nov. 13, 2013, 3 pages.
Josef Hallberg et al. Abstract Positioning with Bluetooth. CiteSeerX, retrieved Nov. 13, 2013, 1 page.
IPhone 5s: About Touch ID security, retrieved Feb. 12, 2014, 3 pages.
IOS 7: Understanding Location Services, retrieved Feb. 12, 2014, 4 pages.
IOS: Understanding iBeacon, retrieved Feb. 12, 2014, 2 pages.
Location APIs. Android Developers, retrieved Feb. 12, 2014, 1 page.
WiFi Certified Passpoint. Wi-Fi Alliance, retrieved Feb. 12, 2014, 3 pages.
Joyce Wang. Sochi Olympics—A Test Bed for New Comcast Services. CableFax Portal, dated Feb. 3, 2014, 2 pages.
Mobile 4G, WiMAX Forum, retrieved Feb. 12, 2014, 2 pages.
Bluetooth Smart Technology: Powering the Internet of Things. Low Energy Bluetooth Technology Website, 2 pages, retrieved Feb. 24, 2014.
About Z-Wave Technology, 2 pages, retrieved Feb. 24, 2014.
Wi-Fi Direct Wikipedia, retrieved Feb. 25, 2014, 5 pages.
Bluetooth, Wikipedia retrieved Feb. 25, 2014, 23 pages.
"The heat is on: Honeywell is finally challenging the Nest thermostat," Nathan Ingraham, theverge.com, Jun. 10, 2014.

* cited by examiner

| 401 | 6:00 | 6:30 | 7:00 | 7:30 | 408 |
|---|---|---|---|---|---|
| 402 NBC | The Office | The Office | Parks and Recreation | Parks and Recreation | John & Jane |
| 403 CNBC | News | News | News | News | John |
| 404 USA | NCIS | | NCIS | | John & Jane |
| 405 SYFY | Sharknado | | | | Jane |
| 406 BRAVO | Real Housewives | Real Housewives | Real Housewives | | Jane |

FIG. 4

MERGING PERMISSIONS AND CONTENT OUTPUT

CROSS-REFERENCE TO RELATED APPLICATIONS

This application is a continuation of and claims priority to U.S. patent application Ser. No. 17/510,694, filed Oct. 26, 2021, which is a continuation of U.S. patent application Ser. No. 16/008,350, filed Jun. 14, 2018 (now U.S. Pat. No. 11,197,072), which is a continuation of U.S. patent application Ser. No. 14/456,601, filed Aug. 11, 2014 (now U.S. Pat. No. 10,045,090), each of which is hereby incorporated by reference in its entirety.

BACKGROUND

Television services—such as cable television—offer different bundles of channels that viewers may subscribe to. Different subscription bundles may include different channels. Different users may have different tastes, and therefore subscribe to different channels. There will always be a need for improved user convenience in accessing desired television content.

SUMMARY

Some aspects of the disclosure relate to methods and systems for viewing content included in a user's subscription. When a user goes to a different location—e.g., a friend's house with a different subscription, a hotel, an office, a restaurant, a bar, a vacation home, a boat, an airplane—a set-top box at the different location may be granted merged access privileges for the content associated with the user's account and with the different location's account.

For example, aspects of the disclosure may relate to determining, by a computing device associated with a first user account, that a wireless device associated with a second user account is proximate to the computing device, and receiving, in response to determining that the wireless device is proximate to the computing device, merged access to content associated with the first and second user accounts.

A method may include determining that the wireless device is not proximate to the computing device, and denying access to the permissions and the content associated with the second user account, wherein denying access to the permissions and the content associated with the second user account may include reverting to providing access to only the permissions and the content associated with the first user account. The computing device may lose access to the permissions and the content associated with the second user account after a timeout period. The content associated with the second user account may include a video program, and the timeout period may be at least as long as the remainder of the video program.

The method may include determining that the content associated with the second user account includes currently playing content, determining that the first user account does not have permissions or access to the currently playing content, and displaying a prompt for the first user account to purchase access to the currently playing content. The second user account may receive a reward in response to the first user account purchasing access to the currently playing content.

The computing device may receive access to the content associated with the second user account including receiving permissions and access to only some of the content associated with the second user account. The some of the content associated with the second user account that the computing device receives access to may include a type of content.

The computing device may grant to the wireless device permission to remotely control the computing device. The permission to remotely control the computing device may be restricted to controlling the computing device while the computing device is accessing the content associated with the second user account.

Alternatively or additionally, aspects of the disclosure may relate to receiving, at a server, from a mobile device associated with a first account, acknowledgement of the mobile device detecting a beacon broadcast by a computing device associated with a second account, and granting, to the computing device, merged permissions and access to content associated with the first account and the second account, in response to the mobile device detecting the beacon broadcast by the computing device.

The method may include transmitting content associated with both the first and second user accounts, and reducing a number of advertisements to be displayed during playback of the content associated with the first and second user accounts. Granting the merged permissions may include determining a content restriction placed on the second user account, and applying the content restriction to the first user account. The method may include aggregating information associated with the first user account and the second user account, and making a recommendation based on the aggregated information.

The method may include requesting a confirmation of the mobile device detecting the beacon broadcast by the computing device, receiving a message from the mobile device including an indication that the mobile device is no longer is detecting the beacon broadcast by the computing device, and revoking, for the computing device, the merged permissions and access to the content associated with the first account and the second account.

The method may include receiving a message from the mobile device including an indication of the computing device requesting a grant of permissions and access for the computing device to at least part of the content associated with the second account, and updating the permissions and the access to content associated with the first account to include the at least part of the content associated with the second account.

The method may include granting to the mobile device, merged permissions and access to content associated with the first account and the second account, in response to the mobile device detecting the beacon broadcast by the computing device.

Alternatively or additionally, aspects of the disclosure may relate to connecting, by a computing device associated with a first profile, to a mobile device associated with a second profile, and receiving merged permissions including permissions associated with the first and second profiles and merged access to content including content associated with the first and second profiles.

The method may include displaying a list of content accessible to the computing device including the merged access to content. The method may include disconnecting from the mobile device, and losing the merged permissions and the merged access to content in response to disconnecting from the mobile device.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which:

FIG. 4 depicts an example television program guide for displaying merged content access rights.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
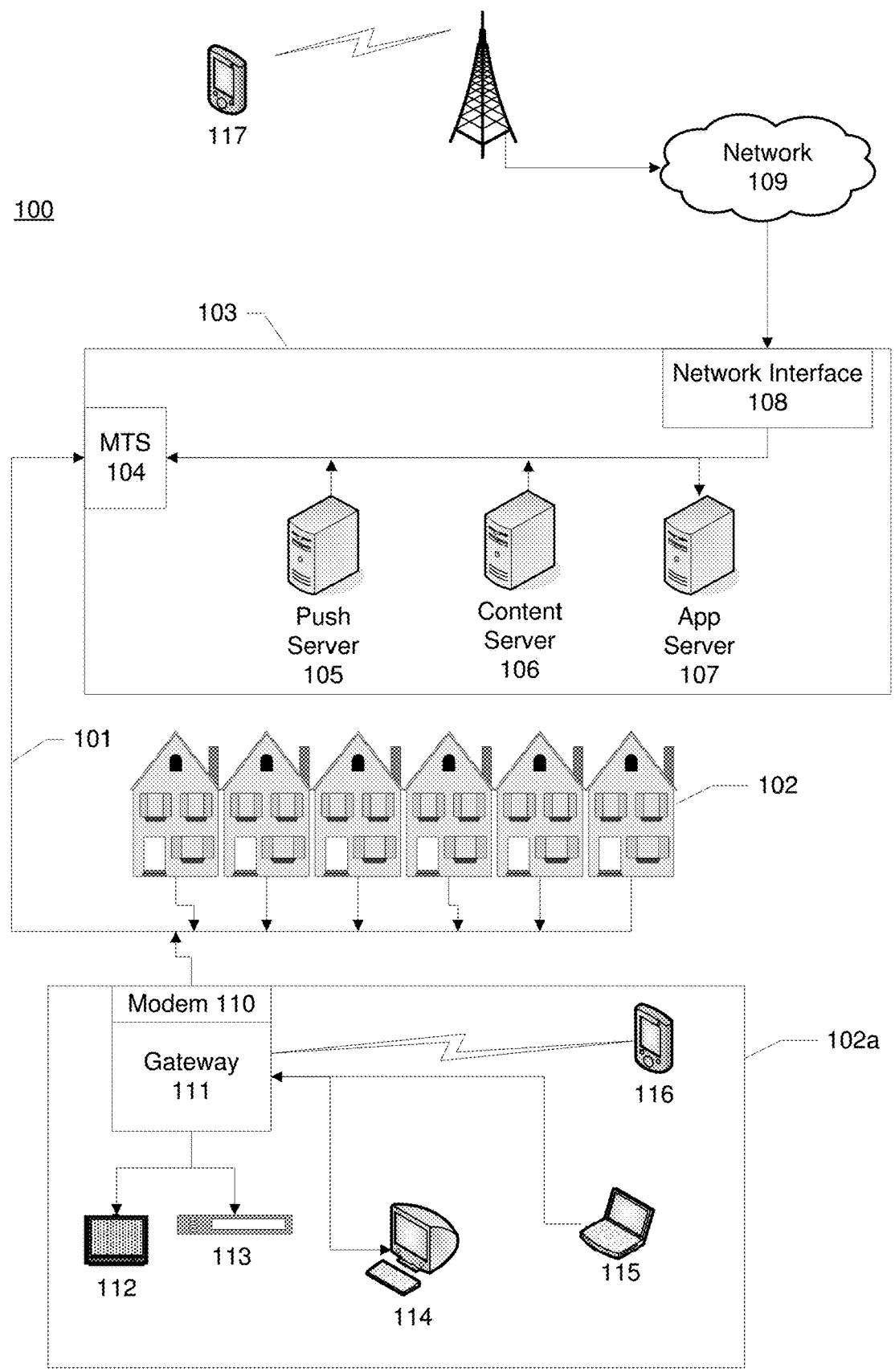
FIG. 1 illustrates an example information distribution network.

FIG. 1 illustrates an example information distribution network 100 on which many of the various features described herein may be implemented. The network 100 may be any type of information distribution network, such as satellite, telephone, cellular, wireless, etc. One example may be an optical fiber network, a coaxial cable network or a hybrid fiber/coax distribution network. Such networks 100 may use a series of interconnected communication lines 101 (e.g., coaxial cables, optical fibers, wireless, etc.) to connect multiple premises (e.g., businesses, homes 102, consumer dwellings, etc.) to a central office (e.g., headend) 103. The central office 103 may transmit downstream information signals onto the lines 101, and each home 102 may have a receiver used to receive and process those signals.

There may be one line 101 originating from the central office 103, and it may be split a number of times to distribute the signal to the homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a modem termination system (MTS) 104, such as a cable modem termination system (CMTS), which may be a computing device configured to manage communications between devices on the network of lines 101 and backend devices such as servers 105-107 (to be discussed more below). The MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various homes 102, and to receive upstream communications from those modems on one or more upstream frequencies. The central office 103 may also include one or more network interfaces 108, which may permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX, and COMET). For example, an application server may be responsible for collecting television program listings information and generating a data download for electronic program guide listings. An application server may be responsible for monitoring user viewing habits and collecting that information for use in selecting advertisements. An application server may be responsible for formatting and inserting advertisements in a video stream being transmitted to the homes 102. An application server may be responsible for receiving user remote control commands, and processing them to provide an intelligent remote control experience. An application server may perform multiple functions (e.g., a combination of one or more of the above-described functions), or an application server may be dedicated to one function.

An example home 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway interface device 111 may be a set-top box (STB), digital video recorder (DVR), computer server, or any other desired computing device. The gateway interface device 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), BLUETOOTH interfaces, and others.

Figure 2:
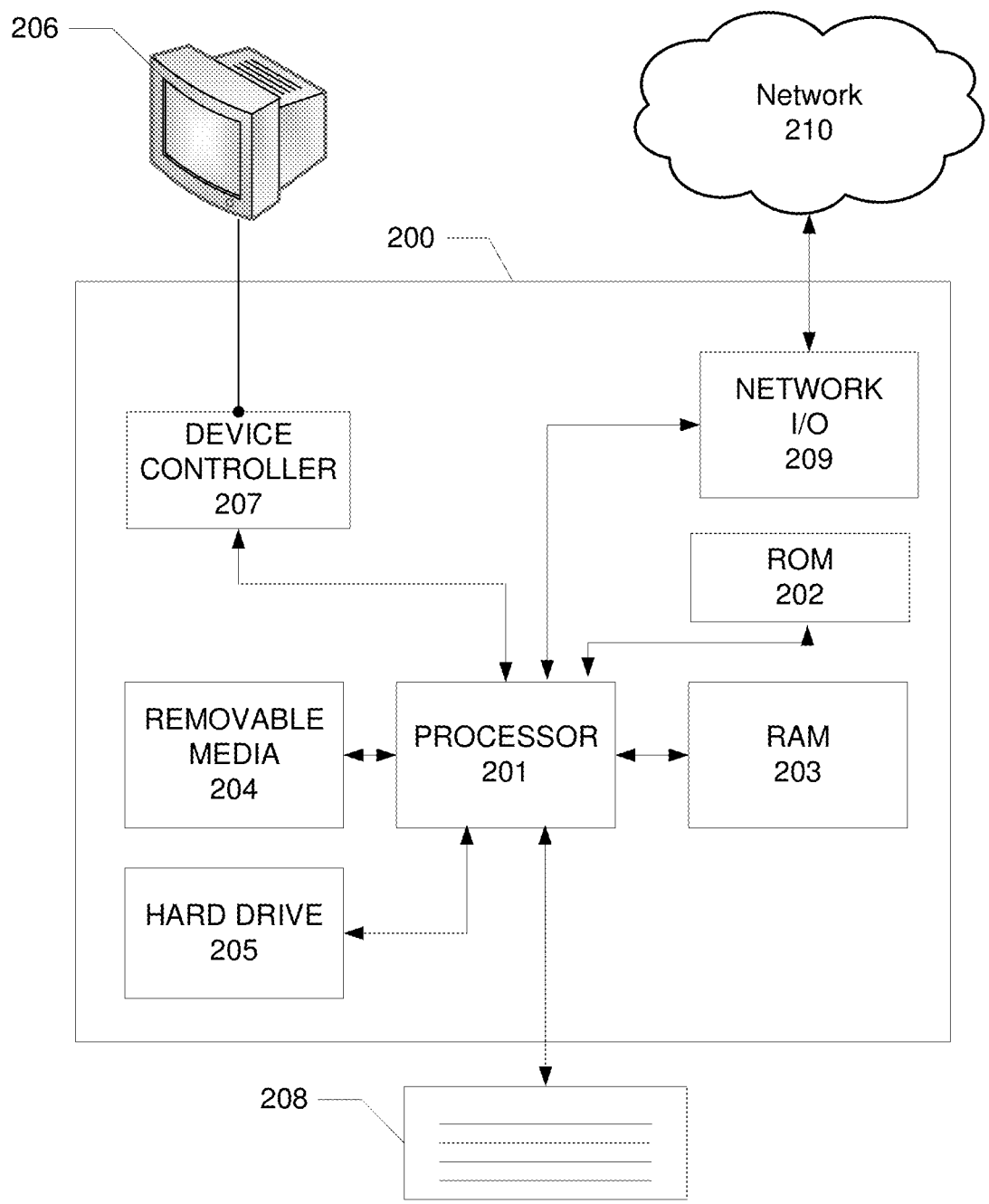
FIG. 2 illustrates an example hardware platform on which the various elements described herein may be implemented.

FIG. 2 illustrates general hardware elements that may be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Various features described herein offer improved remote control functionality, for example, to users accessing content from the central office 103. For example, one such user may be a viewer who is watching a television program being transmitted from the central office 103 or any content provider. Particular aspects of the disclosure may relate to transmissions between a remote control and a gateway interface device 111. Such and other aspects of the disclosure will be described in detail below.

Figure 3B:
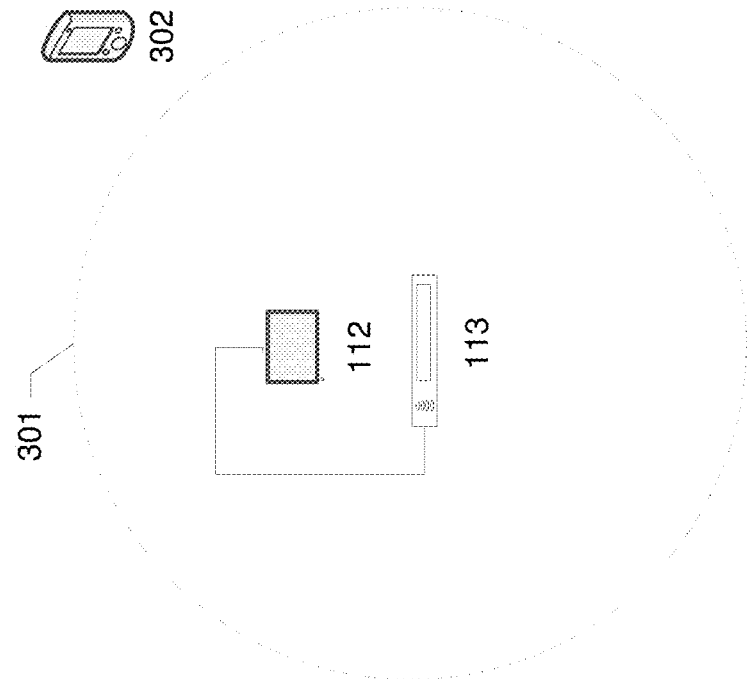
FIGS. 3A and 3B depict an example embodiment of a set-top box communicating with a mobile device.
Figure 3A:
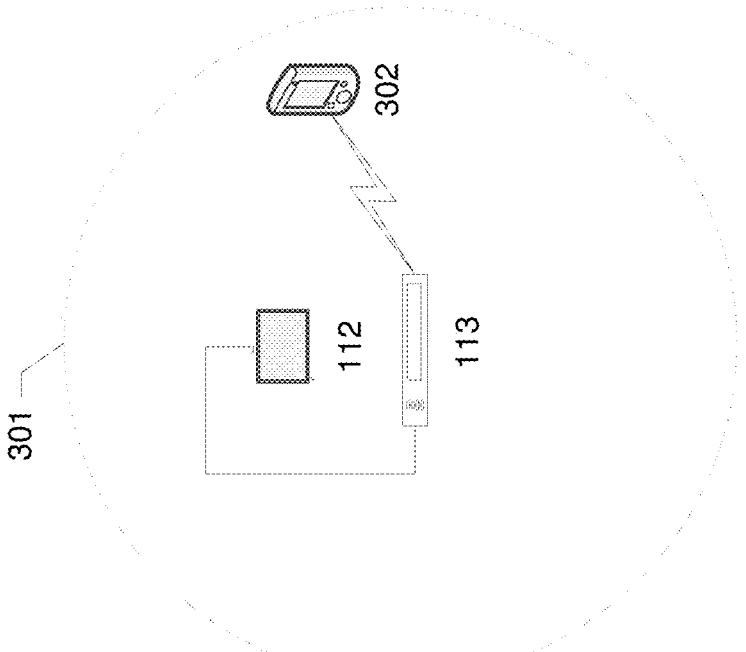

FIG. 3A and FIG. 3B depict an example embodiment of a set-top box communicating with a mobile device. A set-top box (e.g., the STB 113) may be connected to a television (e.g., television 112). The television may display content received by the set-top box. The set-top box may be associated with a user account. For example, if the set-top box is in a user's home, the set-top box may be associated with a user account for the home's cable-television subscription. Alternatively or additionally, the set-top box may be associated with another or an additional user account. For example, the set-top box may be associated with a person's social media account (e.g., Facebook, Twitter, Google Plus), a streaming video service account (e.g., Netflix, Amazon Prime Instant Video), or another television service (e.g., satellite television). The set-top box may be associated with user accounts for multiple services. The set-top box may be associated with multiple user accounts for a single service.

A user may have a wireless device associated with a user account. The wireless device may have access to the internet (e.g., smartphone 302, laptop, tablet, iPod touch, Google Glass, wearable device). Alternatively, the wireless device may not have access to the internet (e.g., radio-frequency identification (RFID) device, near-field communication (NFC) device, keyfob). In either case, the wireless device may be associated with one or more user accounts and facilitate entitlement merging. For example, the wireless device may be associated with the user's social media account, streaming video service account, or television service account (e.g., the user's home cable-television subscription account). The wireless device may be associated with user accounts for multiple services. The wireless device may be associated with multiple user accounts for a single service.

In the example depicted in FIG. 3, the device (e.g., smartphone 302) may be associated with one or more user accounts, such as a cell phone account (e.g., Sprint, Verizon), the user's social media account, streaming video service account, or television service (e.g., the user's home cable-television subscription account).

A user account associated with a service may include permissions and access to content. For example, a user account associated with a home's cable-television subscription may include permissions to watch the television channels that the home subscribes to, on-demand content (such as videos and television shows), games, and other content.

A home's cable-television subscription may be associated with multiple user accounts. For example, each member of the home may have an individual account. Each individual account may include a user's television preferences, links to the user's other accounts (e.g., social media accounts), and more. The cable-television service provider may use the individual's account information for providing a personalized experience for the user (e.g., recommending television shows, recommending movies, personalizing advertisements, or targeting advertisements). An individual account may have certain access limitations (e.g., no pay-per-view, parental controls, content restrictions).

A set-top box (e.g., STB 113) may determine that another device (e.g., smartphone 302) is within a certain range of the set-top box. For example, the set-top box may implement BLUETOOTH, Wifi, near-field communication (NFC), a transmitter, a beacon, or some other technology for detecting the presence of another device. The range 301 of the set-top box's detection may be limited to a room in a home (e.g., a living room), an entire home, an office, a floor of an office building, or some other fixed boundary. The set-top box may determine that the device is within the range 301 of the set-top box when the device is within a threshold distance of the set-top box (e.g., within 20 feet).

The set-top box may detect another device by communicating back and forth with the device (e.g., pair with the device using BLUETOOTH). Alternatively or additionally, the set-top box may determine that the device is within the range 301 of the set-top box without communicating back and forth with the device. For example, the device may be a keyfob, and the set-top box may determine that the keyfob is within the range 301 of the set-top box.

In another embodiment, the set-top box may not directly detect the device, but may determine that the device is within a range 301. For example, the set-top box may use global-positioning system (GPS) coordinates of the device and the set-top box to determine that the device is within a certain range of the set-top box. Alternatively or additionally, the STB may use some other method of determining the respective locations of the device and the set-top box to determine whether the device is within a certain range of the set-top box.

In FIG. 3A, the device (e.g., smartphone 302) may come into the set-top box's range 301. In one embodiment, the set-top box may determine that the device comes into the set-top box's range 301. In another embodiment, the device may determine that the device comes into the set-top box's range 301.

The device may receive an indication that the device came into the set-top box's range 301. The device may prompt the user as to whether to share permissions and content access with the set-top box. A user may have the option to "remember" one or more set-top boxes (e.g., the STB 113) to automatically connect with. In this manner, a device may automatically connect to and share permissions and content access with known devices without prompting a user every time.

Similarly, the set-top box may require a confirmation before receiving merged content access. For example, the set-top box may output a display including a prompt indicating the detection of or connection with the device, and ask whether to receive merged access to content. Similarly to the device (e.g., the smartphone 302), the set-top box may "remember" one or more visiting wireless devices (e.g., the smartphone 302) to automatically connect with and receive merged content access.

For example, an on-screen verification process may allow a user to identify how the device should interact with the set-top box. For example, the set-top box may output a display including a code that appears on the television. The user may enter the code that appears on the television into the device, thereby confirming that the user is sharing permissions or merged content access to the set-top box. In confirming the sharing permissions or merged content access, the user may specify what content or permissions should be granted to the set-top box (e.g., differentiate between a set-top box at the user's home and a set-top box at the user's friend's home).

A server (e.g., the content server 106) may receive a notification that the device came into the set-top box's range 301. For example, the device may transmit to the server a message that the device and the set-top box paired via BLUETOOTH. In another example, the set-top box may transmit to the server a message that the device and the set-top box paired via BLUETOOTH. In another example, both the set-top box and the device may transmit to the server a message that the device and the set-top box paired via BLUETOOTH. As described earlier, the set-top box and the device may communicate or detect each other or be detected using other methods, any or all of which may trigger a message to the server.

As is described in more detail below, the server may grant access to additional content in response to receiving a notification that the device is within the range 301 of the set-top box. For example, the server may merge the content associated with the user accounts respectively associated with the set-top box and the device. For example, the set-top box may be associated with a cable-television user account for Jane Doe, who lives at the home where the set-top box is located. John Smith, who may live across town but frequently visit Jane Doe at her home, may own the device, which may be associated with John Smith's cable-television user account for his home across town. Jane Doe's cable subscription may include different channels than John Smith's cable subscription. In response to receiving notification that John Smith is visiting Jane Doe, the server may provide, on Jane Doe's set-top box, merged access to the content accessible to Jane Doe through her cable subscription and to John Smith through his cable subscription.

Merged content associated with the user accounts may include access to accounts with multiple services that the respective users subscribe to. For example, the user of the device may have Netflix, Amazon Prime, Hulu Plus, and online cloud storage accounts, in addition to a cable subscription. The set-top box, when receiving merged content associated with the user accounts respectively associated with the set-top box and the device, may receive merged content associated with the services that both users have (e.g., merged content access of two different cable subscription plans), and also receive access to content associated with other services that only one of the users have (e.g., only one of the users have a Netflix subscription, but both the set-top box and the device receive access to the Netflix subscription). Additionally, merged content associated with the user accounts may include access to previously purchased content available on one or more services or applications (e.g., access the user's previously purchased content on iTunes).

Alternatively or additionally, one or more connected devices may receive additional permissions and access to additional digital media or goods, such as applications, access to websites, shared premium access or content, or the like. For example, a tablet computer associated with the same user account as a set-top box may receive access to additional apps when the set-top box connects with a device (e.g., a smartphone) associated with a different user account than the set-top box.

Thus, one embodiment may include determining, by a computing device associated with a first user account, that a wireless device associated with a second user account is proximate to the computing device, and receiving, by the computing device, in response to determining that the wireless device is proximate to the computing device, merged access to content associated with the first and second user accounts.

Thus, one embodiment may include granting, by a server, to a mobile device, merged permissions and access to content associated with a first account and a second account, in response to the mobile device detecting a beacon broadcast by a computing device.

In FIG. 3B, the device (e.g., smartphone 302) moved outside the range 301 of the set-top box. Similarly as to what was described above in connection with the device or the set-top box or both determining that the device is within the range 301 of the set-top box, the device or the set-top box or both may determine that the device is outside the range 301 of the set-top box.

The server (e.g., the content server 106) may receive a notification that the device moved outside the set-top box's range 301. Similarly to what was described above, the server may receive a notification of the device moving outside the set-top box's range 301 from the device, the set-top box, or both.

Thus, one embodiment may include determining, by the computing device, that the wireless device is not proximate to the computing device, and denying, by the computing device, access to the permissions and the content associated with the second user account. Denying access to the permissions and the content associated with the second user account may include reverting, by the computing device, to providing access to only the permissions and the content associated with the first user account.

In some embodiments, a user may have the ability to revoke permissions and content access while the device is within range 301 of the set-top box (e.g., the set-top box may lose access to content in situations other than when the device goes out of range 301 of the set-top box).

In FIG. 4, an example television program guide 400 is depicted for displaying merged content associated with multiple user accounts. In the depicted example, the television program guide 400 displays the merged content associated with John Smith and Jane Doe's cable-television subscription accounts. A set-top box (e.g., the STB 113) may receive the television program guide 400 from a server (e.g., the content server 106), and display the television program guide 400 on a television (e.g., the television 112).

The left-most column 401 may include the television channels available to view (in the depicted example: NBC, CNBC, USA, SyFy, Bravo). The middle columns 407 may include the various programs playing on the various available channels at different times (e.g., 6:00, 6:30, 7:00, 7:30). The right-most column 408 may include an indication (e.g., name) of the subscriber whose access enabled the content to be available. For example, NBC 402 and USA 404 may be common across all cable subscriptions, and therefore available through both John Smith and Jane Doe's cable-television subscription accounts. Therefore, John and Jane's names are both listed in the column 408 next to NBC 402. By contrast, CNBC 403 may be only available on certain cable subscription plans, including the cable subscription plan that John Smith subscribes to, but not the cable plan that Jane Doe subscribes to. Therefore, John's name is listed in the column 408 next to CNBC 403. Similarly, SyFy 405 and Bravo 406 may only be available on other cable subscription plans, including the cable subscription plan that Jane Doe subscribes to, but not on the cable subscription plan that John subscribes to. Therefore, Jane's name is listed in the column 408 next to SyFy 405 and Bravo 406. Thus, because the set-top box receives merged permissions and access to the content associated with both John Smith and Jane Doe's cable-television subscription accounts, the television program guide 400 displays content available to both John Smith and Jane Doe.

Alternatively or additionally, the set-top box may display content access in one or more additional manners. For example, the set-top box may display subscriber names on a different part of the screen, for example in the corner of the screen when playing a channel, next to a channel's number and name when changing channels, on the screen of a remote control or a mobile device, or in another manner.

Alternatively or additionally, the set-top box receiving access to the content associated with the second user account (e.g., John Smith's cable-television subscription account) may include receiving permissions and access to only some of the content associated with the second user account. For example, John Smith's cable-television subscription may also include access to MSNBC. Even if Jane Doe's cable-television subscription does not include MSNBC, the set-top box may not receive access to MSNBC when receiving access to content through John Smith's account. For example, a content provider or owner (e.g., owner or provider of channel, movie, or television show) may not wish to have its content be shareable when a subscriber, licensee, or owner is visiting another residence. For example, MSNBC may tell the cable-television provider not to make MSNBC available to devices associated with non-subscribers. In another example, a channel may be available, but not a certain program. For example, MSNBC may allow a certain show (e.g., Morning Joe) to be viewed on a device associated with a non-subscriber, but not another show (e.g., Hardball). Alternatively or additionally, another entity may determine whether a show, channel, movie, or other content is available for sharing or not. Thus, content-sharing restrictions may be broad (e.g., an entire channel) or narrow (e.g., a particular show, a particular episode of a show, or a particular movie).

The shared content associated with the visitor's user account may be a type of content. For example, content-sharing restrictions may be based on a channel—as discussed above. Alternatively or additionally, content sharing may be limited to movies or television shows. Alternatively or additionally, content sharing may be limited to only new programs, programs recently aired within a certain time, programs aired at least an amount of time previously, reruns, or some other delineation of content.

A user may have the option to select what content to share. For example, a user may only want to bring access to a certain show when visiting a friend's house. For example, John may want to watch a football game at Jane's house, but not the cooking channel. Therefore, John may select certain shows (e.g., using a set-top box at John's house, a website, calling the cable company, an app on John's smartphone, or the like) to share when John visits another's house. The selection of shared content may be location specific (e.g., John wants to bring football access to Jane's house, but bring the cooking channel to Jeff's house). The selection of shared content may be time specific (e.g., if John is visiting at night, bring football, but if John is visiting in the morning, bring the cooking channel).

A user may be restricted to sharing a certain number of channels or a certain number of shows or a certain number of movies in a certain time period. For example, a subscriber account may be limited to sharing two movies per week. In another example, a subscriber may be limited to selecting three channels at a time for sharing. Alternatively or additionally, a subscriber may be limited to adjusting sharing settings only a certain number of times within a certain time period (e.g., once a week, once a month, twice every three months, or some other time period).

Thus, in one embodiment, a computing device receiving access to content associated with a second user account may include the computing device receiving permissions and access to only some of the content associated with the second user account. Some of the content associated with the second user account that the computing device receives access to may include a type of content.

Figure 5:
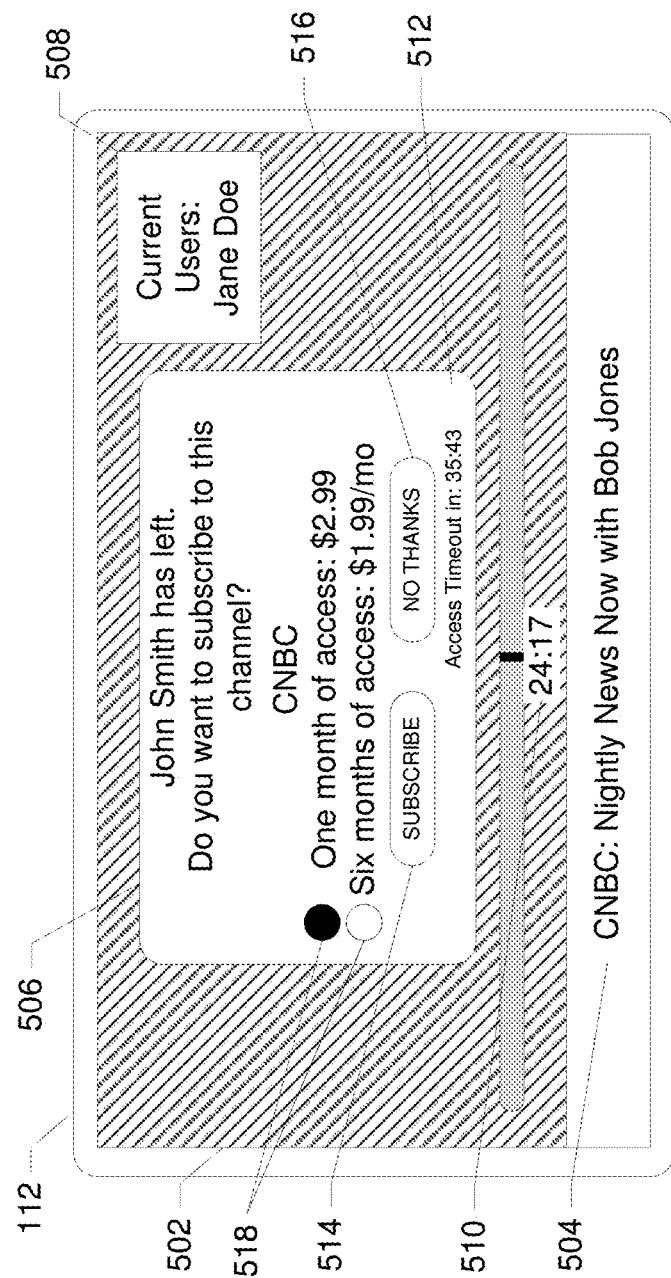
FIG. 5 depicts an example graphical user interface that may be displayed when a computing device determines that a wireless device has left the proximity of the computing device.

FIG. 5 depicts an example graphical user interface (GUI) that a set-top box (e.g., STB 113) may output to a display (e.g., television 112) when the set-top box determines that the device (e.g., smartphone 302) has left the proximity of the set-top box.

The set-top box may monitor the users that are in the proximity of the set-top box. The set-top box may use similar methods for monitoring the users that are in proximity to the set-top box as the set-top box uses for initially detecting one or more users in the proximity of the set-top box (e.g., BLUETOOTH, Wifi, etc.).

The television 112 may display a video program 502. The video program 502 may be a video program 502 for which content access is enabled because of the cable subscription of a user associated with the set-top box. Alternatively or additionally, the video program 502 may be a video program 502 for which content access is enabled because of the cable subscription of a user not associated with the set-top box, but that the set-top box has determined is within a threshold proximity of the set-top box, as described above. In the depicted example, the video program 502 is playing on CNBC 403, which in the depicted example is only available through the access of John Smith, a user who is visiting Jane Doe. The set-top box may be associated with Jane Doe, but may have determined that John Smith is visiting, and therefore the set-top box may have received merged content access to content associated with Jane Doe and John Smith's respective cable subscription accounts.

Partway through the playback of the video program 502, John Smith may decide to leave the proximity of the set-top box. For example, John Smith may receive a call on his mobile phone, and step out of the room where the set-top box is located. Or potentially John Smith got called into work, and had to leave Jane Doe's house in the middle of the show. For whatever reason, John Smith left the proximity of the set-top box. The set-top box may determine the departure of John Smith, and may display the depicted GUI in response.

The television 112 may display the name of the show currently playing 504. In the depicted example, the name 504 of the video program 502 is "Nightly News Now with Bob Jones." The television 112 may display the channel that the video program 502 is currently playing on—in the depicted example, CNBC 403—with the name 504 of the video program 502.

The set-top box may pause the playback of the video program 502 in the background, and output to the display a pop-up window 506. In the depicted example, Bob Jones may have been reporting on the latest sports fishing events happening in Alaska when John Smith left the room. The set-top box may have determined that John Smith left the room, paused the playback of the video program 502 in response to determining that John Smith left the room, determined that the channel currently playing CNBC 403 is a channel that the set-top box had permissions and content access to because of the permissions and content access of John Smith, determined that the remaining user or users do not have permissions and content access to view the current video program 502, and displayed a prompt 506 that prompts the remaining user or users to purchase access to the channel.

The prompt 506 may include a message indicating that the user through whom the set-top box had access to the playing video program 502 is no longer in the proximity of the set-top box. The prompt 506 may include a prompt that prompts the remaining user or users whether or not to purchase access to the content. For example, the prompt 506 may offer the remaining user or users the option to subscribe to a specific channel, such as the channel CNBC 403 that Jane Doe and John Smith were watching. Alternatively or additionally, the prompt 506 may offer the remaining user or users the option to purchase access to a specific show, such as a certain series. The specific show or series may be the currently playing video program 502. The prompt 506 may offer the remaining user or users the option to purchase access to a particular episode of a certain series, such as an episode of the certain series that is the currently playing video program 502.

The purchased access may include an add-on to the purchasing user's account. The purchased access may alternatively or additionally include altering the subscription or plan that the purchasing user was signed up for at the time of the purchase. The purchased access may include video on demand (VOD) content. The purchased access may include downloadable content. The purchased access may add additional rights to the purchasing user's account. For example, the purchasing user may have access to view purchased content on another device, such as a mobile phone or a tablet. The purchased access may be for a certain duration of time (e.g., one month or six months) or the purchased access may be indefinitely. The purchased access may expire after a certain number of views (e.g., one view, three views, etc.). The different features or permissions included with the purchased access may include different prices. A price of purchasing access may depend on another feature or permission already associated with the purchasing user's account, or alternatively or additionally the price may depend on another feature or permission associated with the account of the user through whom the set-top box originally received access to the content.

The prompt 506 may include a method for the remaining user to accept or reject the option to purchase access to the currently playing video program 502. For example, the SUBSCRIBE button 514, when selected, may subscribe the selecting user to the currently playing channel for the indicated amount of time. The user may be subscribed indefinitely (e.g., until the user cancels), or alternatively may only be subscribed for a fixed period of time (e.g., one month or six months). In some embodiments, the user may select a subscription option (e.g., a period of time) using, for example, a radio button 518. If multiple users are still watching the television (e.g., within the proximity of the STB 113), then the set-top box may, in response to receiving an indication to purchase access to content, display a prompt that allows the selection of a user account with which to purchase content. For example, if John Smith, Jane Doe, and Frank O'Connor were watching television together, the access to the currently playing video content being received through John Smith's account, and if John Smith left in the middle of the program, the set-top box may, in response to the selection of the SUBSCRIBE button 514, display an additional prompt asking whether to purchase access to the currently playing video content on Jane Doe's account, on Frank O'Connor's account, or both. Access to the purchased content may then be added to the selected account.

If the user elects to purchase permissions or content access, a content service provider may provide a reward or incentive to the user whose account originally was used to access the content. For example, if Jane Doe and John Smith were watching CNBC on Jane Doe's set-top box that received merged content access to Jane Doe and John Smith's respective cable subscription accounts, where CNBC was part of John Smith's cable subscription account but not part of Jane Doe's cable subscription account, then John Smith left, then Jane Doe purchased access to CNBC, John Smith may receive a reward or incentive. For example, a reward or incentive may include an account credit, access to an additional channel or channels, access to additional VOD content, access to downloadable content, more sharing permissions or rights, a statement credit, a gift card, a cash reward, or some other reward or incentive. The reward or incentive may be associated with the content that the purchasing user purchased after viewing through a friend's access rights. For example, John Smith may receive a CNBC t-shirt or mug after Jane Doe purchased access to CNBC. The purchasing user may also receive an incentive or reward.

Alternatively, when presented with the prompt 506 to purchase access to the currently playing video program 502, the user may select the NO THANKS button 516, indicating that the user does not desire to purchase access to the content. The set-top box may then determine or receive an indication of whether the user may continue to watch the currently playing video program 502. In the depicted example, if Jane Doe selects the NO THANKS button 516, the prompt 506 would simply minimize, and Jane Doe may watch the remaining 35 minutes and 43 seconds of Nightly News Now with Bob Jones.

The television 112 may display an indication 508 of the users remaining in the proximity of the set-top box. In the depicted example, Jane Doe is the only user still in the proximity of the set-top box after John Smith left the proximity of the set-top box. The indication 508 may dynamically update as users come and go. That is, the set-top box may constantly be receiving updated permissions associated with the users currently in proximity to the set-top box, and the indication 508 may accordingly update according to the users whose permissions and content access rights the set-top box currently has access through.

The television 112 may display a timeline 510 that indicates the current progress of the currently playing video program 502. In the depicted example, Nightly News Now with Bob Jones has a runtime of 60 minutes. John Smith left the proximity of the set-top box when the video program 502 was at time 24 minutes and 17 seconds, which is displayed on the timeline 510.

The set-top box may continue to receive access to the currently playing content for a time after the user with access to the currently playing video program leaves the proximity of the set-top box. For example, the set-top box may receive access for a time period at least as long as the remainder of the currently playing video program 502. In the depicted example, Jane Doe may be granted access to view the remainder of the currently playing Nightly News Now with Bob Jones. Alternatively, the set-top box may receive continued access for a different time period (e.g., 15 minutes). Alternatively, the set-top box may not receive continued access after the user with access leaves the proximity of the set-top box. Whether or not the set-top box receives continued access, or the amount of time of that continued access, may depend on permissions or content associated with the accounts associated with the user profiles of the user with access or the user without access or a combination thereof. For example, John Smith's cable subscription plan may allow continued access for shared content until the end of the currently playing video program. Therefore, Jane Doe may be granted access to watch the remainder of Nightly News Now with Bob Jones, the currently playing video program 502, even though John Smith left before the currently playing video program 502.

The set-top box may receive continued access for a combination of the described methods. For example, the set-top box may receive continued access for watching the remainder of the currently playing video program 502 within a certain time frame. For example, if there are 35 minutes remaining in the video program 502, the set-top box may receive continued access until either the video program 502 finishes playing or one hour passes.

Different content—such as specific channels, shows, etc.—may have different restrictions or requirements for continued access.

The set-top box may continue to receive access to the currently playing video program 502 even after power cycling (e.g., turning off the set-top box and turning back on the set-top box). Alternatively, access may end when the set-top box or the television 112 is powered off.

The set-top box may receive continued access to all of the departed user's permissions and content access, or may receive continued access to only a part of the departed user's permissions and content access. The continued access to all or only a part of the departed permissions and content access may be in accordance with the continued access to the currently playing video program 502, described above.

The television 112 may display an indication 512 of the amount of time that the set-top box has continued access. In the depicted example, the set-top box may be 24 minutes and 17 seconds into playing the currently playing video content 502, which is 60 minutes long. In the depicted example, the set-top box receives continued access until the end of the currently playing video program, and therefore the indication 512 of the amount of time that the set-top box has continued access is 35 minutes and 43 seconds.

Thus, in one embodiment, the computing device may lose access to the permissions and the content associated with a second user account after a timeout period. The content associated with the second user account may include a video program, and the timeout period is at least as long as the remainder of the video program.

Alternatively or additionally, a method may include determining that the content associated with the second user account includes currently playing content, determining that the first user account does not have permissions or access to the currently playing content, and displaying a prompt for the first user account to purchase access to the currently playing content. The second user account may receive a reward in response to the first user account purchasing access to the currently playing content.

The set-top box may have restricted functions during playback of a video program through continued access. For example, if the set-top box includes DVR capability, the set-top box may not be able to record a currently playing program. Alternatively or additionally, the DVR may not be allowed to perform other functions, such as pause, fast forward, rewind, or some combination thereof.

A user profile associated with a visiting wireless device (e.g., smartphone 302) may, in response to sharing content with a different computing device (e.g., STB 113) later alter playback of content on devices associated with the user profile. For example, after John Smith leaves Jane Doe's house and returns to his home, John Smith's wireless device may no longer be in proximity to Jane Doe's set-top box. When John Smith returns home, if John Smith wishes to watch the remainder of a video program that he and Jane Doe watched in part at Jane Doe's house, John Smith's set-top box may automatically resume playback where Jane Doe's set-top box left off when John Smith left Jane Doe's house. Even if Jane Doe continued watching the remainder of the program (e.g., accessing the content during a timeout period), John Smith's set-top box may resume playback of the content at the point that John Smith left, based on the time that John Smith's wireless device left the threshold proximity of Jane Doe's set-top box.

Figure 6:
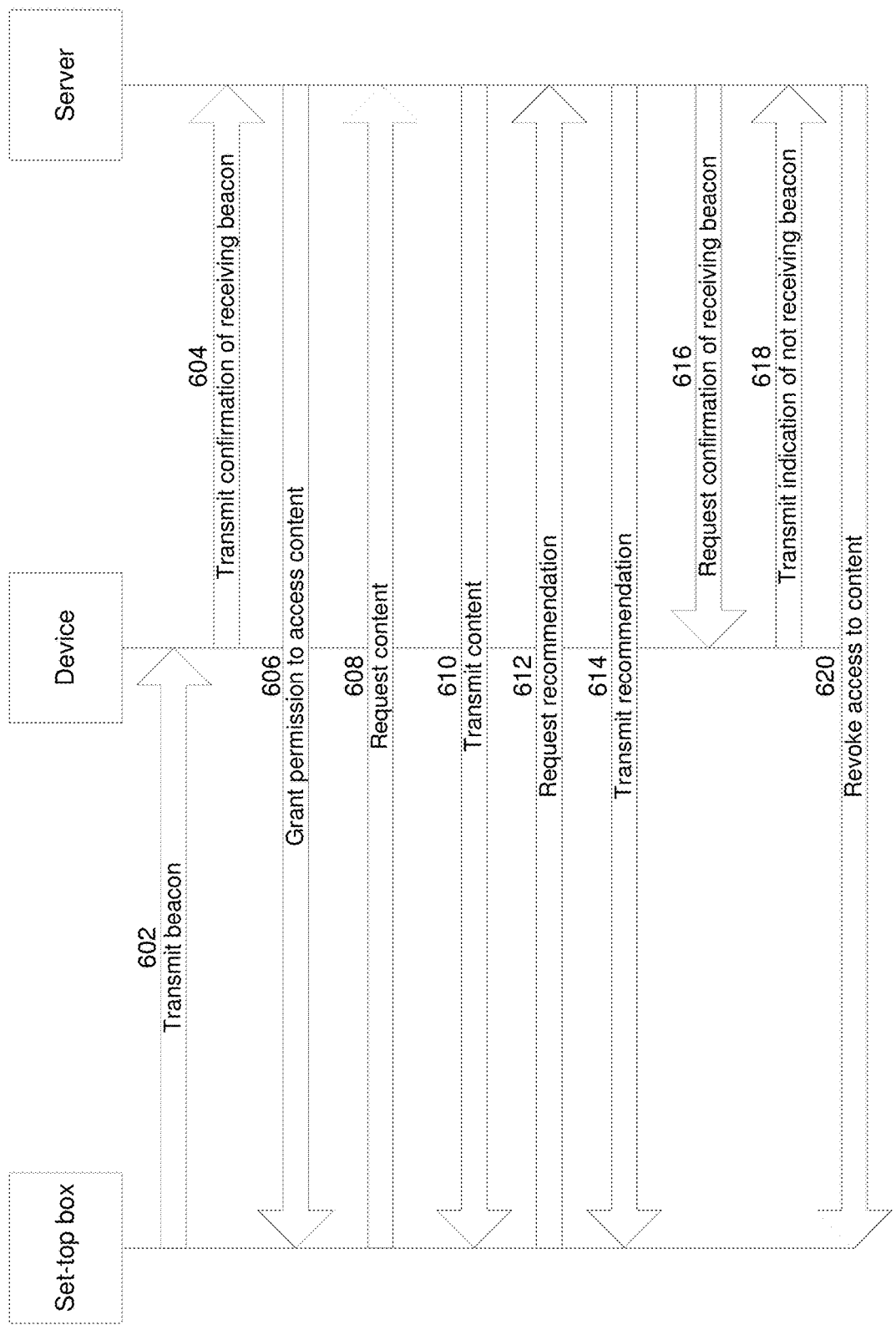
FIGS. 6-7 depict flow diagrams illustrating logic between a computing device, a wireless device, and a server for granting merged permissions and access to content associated with two or more user accounts.

FIG. 6 depicts a flow diagram of illustrative logic between a set-top box (e.g., STB 113), a device (e.g., smartphone 302, tablet, iPod touch, Google Glass, wearable device), and a server (e.g., content server 106) for granting, to the set-top box, additional permissions and access to content associated with a user account or user profile associated with the device, by the server.

In step 602, the set-top box may transmit a beacon that is received by the device. For example, the device may detect a Wifi signal broadcast by the device. The beacon may include information about the set-top box, such as the location, one or more user profiles associated with the set-top box, and the like.

In step 604, the device may transmit to the server a confirmation of receiving the beacon broadcast by the set-top box in step 602. For example, the device may transmit the confirmation over a cell network. Alternatively or additionally, the device may transmit the confirmation to the server over the Wifi signal provided by the set-top box. The confirmation may include information associated with the set-top box, such as the information that may be included in the set-top box's beacon transmitted in step 602. The confirmation may include information about the device, such as the location, one or more user profiles associated with the device, and the like.

After receiving the confirmation of the device receiving the beacon from the set-top box, the server may determine whether to grant access to additional content based on receiving the confirmation. For example, the server may determine whether the one or more user profiles associated with the device are the same as the one or more user profiles associated with the set-top box. Alternatively or additionally, the server may determine whether the one or more user profiles associated with the device are associated with the one or more user profiles associated with the set-top box. For example the server may determine whether the user of the device is the same as the user associated with the set-top box. If the user associated with the device is not the same as the user associated with the set-top box, the server may grant additional access to the set-top box.

In step 606, the server may grant access to permissions or content based on permissions or content access rights of the user associated with the device. For example, if the user of the device has a cable subscription with access to different content (e.g., channels, VOD content) than the cable subscription of the user associated with the set-top box, the server may grant to the set-top box permissions and access rights to the content different than the content that the cable subscription of the user associated with the set-top box. The server may grant access to all of the different content, or may grant access to some of the different content, or the server may grant access to none of the different content.

In step 608, the set-top box may request content from the server. The requested content may be content that the set-top box has permissions or access rights to view. The requested content may be content that the set-top box has permissions or access rights to view based on the rights of the user profile associated with the set-top box, the rights of the user profile associated with the device, or the merged rights of the user profiles associated with the set-top box and the device.

The server may confirm that the set-top box has permissions or access rights to access the requested content. In step 610, the server may transmit the requested content to the set-top box.

In step 612, the set-top box may request a recommendation for content to view. A content service provider may provide content recommendations to a user. For example, a content recommendation may be based on a user's viewing history (e.g., content that the viewer has viewed in the past), based on content that the user has indicated interest in via a social network, content viewed or liked by other viewers with similar tastes or viewing histories to the user, or the like. The content server may determine a merged content recommendation based on the user profile associated with the device and the user profile associated with the set-top box. For example, if the server would normally recommend shows A and B to the user associated with the set-top box, and if the server would normally recommend shows B and C to the user associated with the device, then the server may merge those recommendations, recommending show B when the device is receiving the beacon (e.g., in the proximity) of set-top box. Similarly, the server may merge recommendations based on dislikes of one or more users. In step 614, the server may transmit the merged recommendation to the set-top box.

Thus, in one embodiment, a method may include aggregating information associated with a first user account and a second user account, and making a recommendation based on the aggregated information.

In some embodiments, a user may have the ability to not share the user's viewing history for purpose of building content recommendations. Additionally, a user may selectively share the user's viewing history for purpose of building content recommendations (e.g., include some shows in the shared or merged viewing history, and exclude other shows in the shared or merged viewing history).

In some embodiments, the users may have the option to filter content based on the merged viewing histories of the users. For example, the users may have the option to filter the available content to include only content that neither user has previously viewed. Thus, multiple users may easily find content that none of the users have previously seen.

Alternatively or additionally, the server may, in conjunction with the merged permissions, adjust the advertisements that are received by the set-top box. For example, if three people who live in separate places, each with their own cable subscriptions that include CNBC, are watching CNBC together at a single place, the server may require that a fewer number of advertisements are played during the playback of video content.

Thus, one embodiment may include transmitting, by the server, content associated with both the first and second user accounts, and reducing a number of advertisements to be displayed during playback of the content associated with the first and second user accounts.

In another example, the server may deliver advertisements based on the preferences listed in a user profile (e.g., targeted advertising), and the server may merge the preferences of all the current viewers of the display device attached to the set-top box in order to deliver targeted advertising that is relevant to all the current viewers. For example, if John Smith indicated on his social media account that he likes puppies and cupcakes, but dislikes kittens, and Jane Doe indicated on her social media account that she likes soldiers and cupcakes, but dislikes puppies, then the server may increase the number of advertisements related to cupcakes, while filtering or decreasing the number of advertisements related to puppies and kittens.

Alternatively or additionally, the server may filter content based on other merged elements from the user accounts associated with the set-top box and the one or more devices in proximity to the set-top box. For example, the server may filter available content based on parental controls or other content-filtering applied to one or more of the user accounts. For example, if John Smith is visiting Jane Doe's house, and John Smith's cable subscription is set to disallow R-rated movies from being played using his account, then the set-top box, when receiving merged permissions from Jane Doe and John Smith's accounts, may only display non-R-rated movies, even if Jane Doe's account does not include a restriction against R-rated movies. In other words, the merged permissions may include the most restricted subset of content common to all merged accounts.

Thus, in one embodiment, granting the merged permissions may include determining, by the server, a content restriction placed on a second user account, and applying the content restriction to a first user account.

Alternatively, the merged permissions may include the most expansive combination of content common to all merged accounts. For example, John Smith's smartphone may receive merged permissions while he is in proximity to Jane Doe's set-top box. Even though John Smith's account normally does not allow the viewing of R-rated movies, John Smith's smartphone may receive access to R-rated movies through Jane Smith's account while his smartphone is receiving merged permissions while he is at Jane Smith's house.

The server may occasionally require a confirmation of the device's continued proximity to the set-top box. For example, in step 616, the server may request from the device a confirmation that the device is in proximity to the set-top box. The device may determine whether the device is receiving the beacon broadcast by the set-top box. If the device determines that the device is receiving the beacon broadcast by the set-top box, then the device may transmit a confirmation of the device's continued proximity to the set-top box. Alternatively, if the device determines that the device is no longer receiving the beacon broadcast by the set-top box (e.g., because the device left the proximity of the set-top box), then the device may transmit, as in step 618, an indication that the device is no longer receiving the beacon broadcast by the set-top box.

Upon determining that the device is no longer receiving the beacon broadcast by the set-top box (e.g., the device is no longer in proximity to the set-top box), the server may revoke access to the content associated with the user profile associated with the device. The server may revoke access immediately. The server may revoke access to all of the content associated with the user profile associated with the device, or alternatively only a subset of the content associated with the user profile associated with the device. The set-top box's permissions and content access rights may revert to receiving access to only the permissions and the content associated with the user account associated with the set-top box.

Thus, in one embodiment, a method may include requesting, by a server, a confirmation of a mobile device detecting the beacon broadcast by a computing device, receiving, by the server, a message from the mobile device including an indication that the mobile device no longer is detecting the beacon broadcast by the computing device, and revoking, by the server, for the computing device, the merged permissions and access to the content associated with a first account and a second account.

Alternatively or additionally, as described above, the set-top box may receive some kind of timeout period to continue to access some content, some kind of offer to purchase access to the content, or some other method for continued access. For example, if the device determines that the device again is receiving the beacon broadcast by the set-top box (e.g., the device is again in proximity to the set-top box), then the device may transmit a confirmation of continued receipt of the beacon, and the server may again grant to the set-top box access to content.

Figure 7:
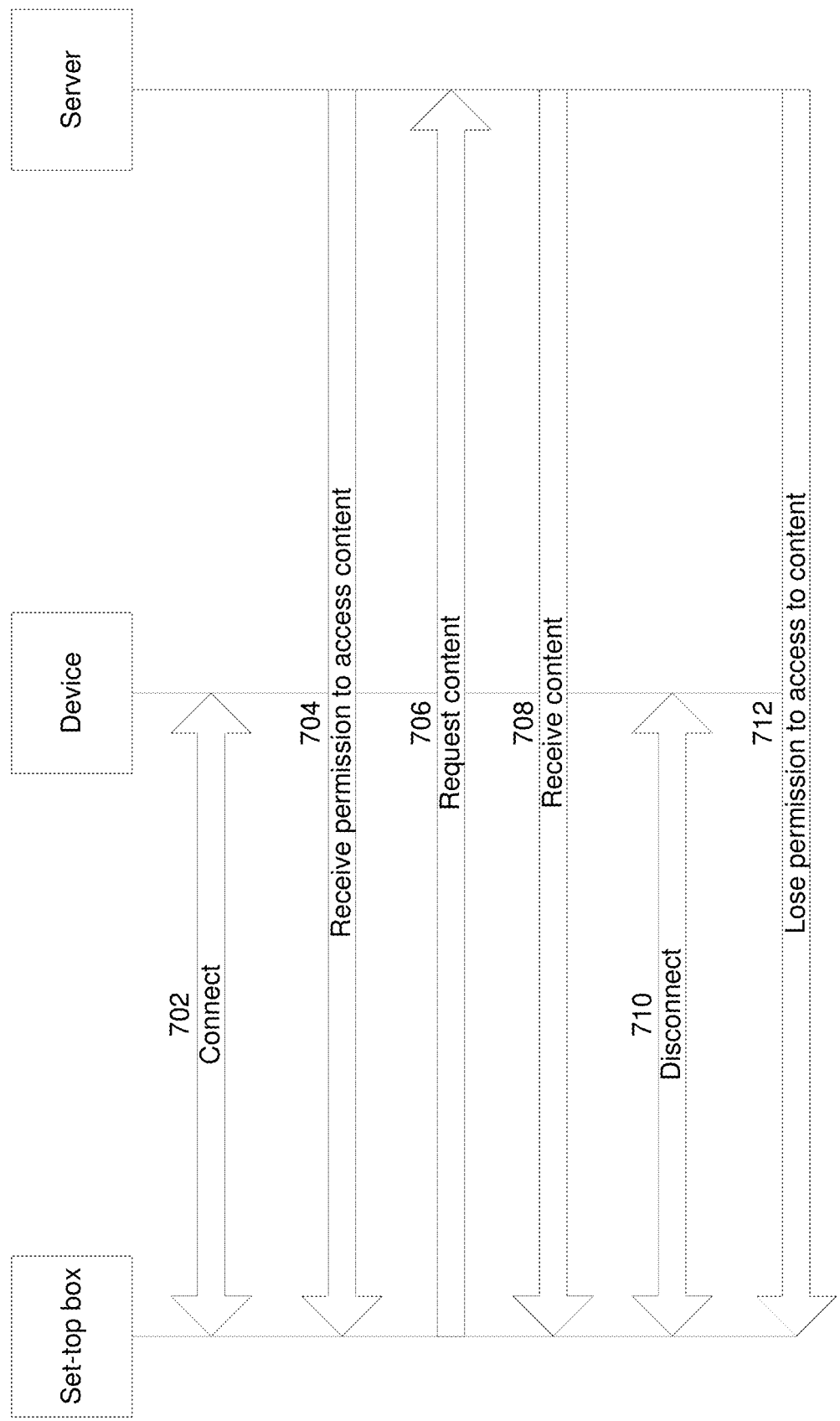

FIG. 7 depicts a flow diagram of different illustrative logic between a set-top box (e.g., STB 113), a device (e.g., smartphone 302, tablet, iPod touch, Google Glass, wearable device), and a server (e.g., content server 106) for granting, to the set-top box, additional permissions and access to content associated with a user account or user profile associated with the device, by the server.

In step 702, the set-top box may connect with the device. For example, the set-top box and the device may pair with each other via BLUETOOTH, Wifi, NFC, or some other two-way communication method, as described earlier. After connecting, the set-top box may transmit a confirmation of the connection to the server. Alternatively or additionally, the device may transmit a confirmation of the connection to the server. The server may require receipt of confirmation from one or both of the set-top box and the device before granting merged access to content to the set-top box.

In step 704, the set-top box may receive permission to access content (e.g., the server may grant merged access to content or permission to access content, as described above). The set-top box may receive the access to the content in response to the connection in step 702 of the set-top box to the device. Alternatively or additionally, the server may grant merged access to content to the device. Alternatively or additionally, the server may grant merged content access to one or more devices associated with the user profile associated with the set-top box or to one or more devices associated with user profile associated with the device.

Alternatively, the server may only grant merged permission or access to one or more devices at a location other than the location associated with the user profile associated with that device. For example, the server may determine that two devices (e.g., smartphones belonging to a married couple) are at a location other than the home address associated with the user profiles associated with the two devices (e.g., the married couple is visiting a friend's house). The server may then grant merged content access to the two smartphones and the set-top box at the location other than the home address (e.g., the friend's set-top box), but not to one or more additional devices not located at that location other than the home address (e.g., a tablet left at the married couple's home may not receive additional content access).

In step 706, the set-top box may request content from the server, as described in connection with FIG. 6. In step 708, the set-top box may receive, in response to the request, the content from the server (e.g., the server may transmit content, as described in connection with FIG. 6).

In step 710, the set-top box may disconnect from the device. For example, the device may leave the proximity of the set-top box, and the BLUETOOTH, Wifi, NFC, or other connection may disconnect. Therefore, in step 712, as described in connection with FIG. 6, the set-top box may lose permission to access the content (e.g., the server may revoke access to the set-top box, the device, or another device's additional content).

Thus, in one embodiment, a method may include receiving, at a server, from a mobile device associated with a first account, acknowledgement of the mobile device detecting a beacon broadcast by a computing device associated with a second account, and granting, by the server, to the computing device, merged permissions and access to content associated with the first account and the second account, in response to the mobile device detecting the beacon broadcast by the computing device.

Alternatively or additionally, a method may include connecting, by a computing device associated with a first profile, to a mobile device associated with a second profile, and receiving, by the computing device, merged permissions including permissions associated with the first and second profiles and merged access to content including content associated with the first and second profiles. The method may include displaying, by the computing device, a list of content accessible to the computing device including the merged access to content. The method may include disconnecting, by the computing device, from the mobile device, and losing, by the computing device, the merged permissions and the merged access to content in response to disconnecting from the mobile device.

Figure 8:
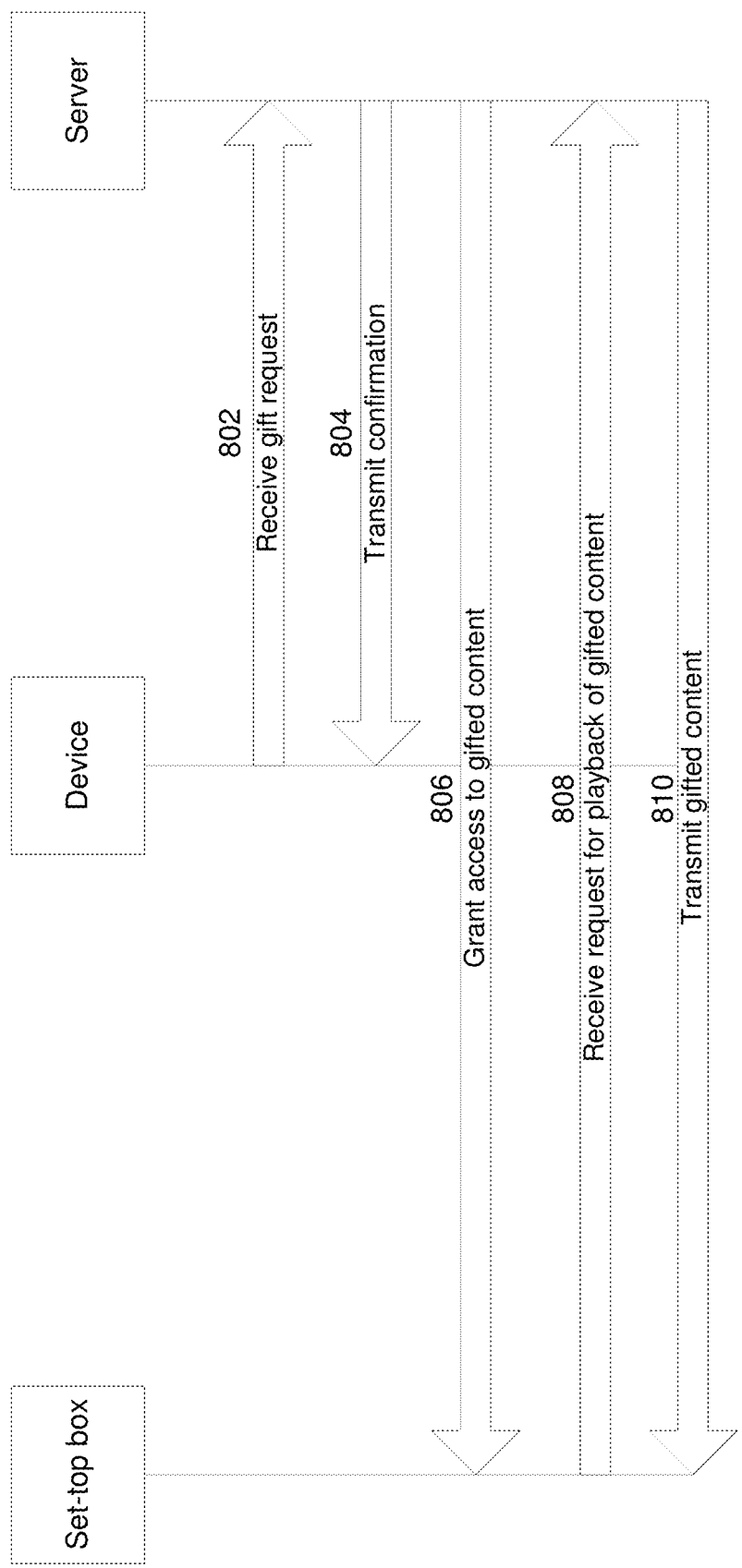
FIG. 8 depicts a flow diagram illustrating logic between a computing device, a wireless device, and a server for gifting content from one user account to another.

FIG. 8 depicts a flow diagram of illustrative logic between a set-top box (e.g., STB 113), a device (e.g., smartphone 302, tablet, iPod touch, Google Glass, wearable device), and a server (e.g., content server 106) for gifting content from one user to another.

In one example, a user may wish to give a friend access to content. The user may give temporary (e.g., short-term) access, or permanent access (e.g., purchase a license or rights for another). Gifting access to content may be associated with granting additional or merged content access.

For example, a user may be visiting a friend, and the user and the friend are watching, on the friend's television, content that the user has access to through the user's cable subscription. If the user decides to leave in the middle of the content, rather than the friend losing access to the content without finishing watching the content, the user may wish to gift to the friend access to the content.

In another example, the user may wish to give a friend access to the user's cable subscription for a period of time. For example, if the user is going out of the country for a month, and the user will not be using the user's cable subscription, the user may gift the user's cable subscription to a friend for the period of time that the user is out of the country. The friend may receive merged content access for the duration of the gift (e.g., the month that the user is out of the country).

In step 802, the device may transmit a gift request to the server. The gift request may include an identifier associated with each of the giver and the recipient (e.g., name, phone number, address, email address, etc.), an identification of the content, or a method for purchase (e.g., credit card, gift card, online payment service, a charge to the giver's cable bill, etc.). In some examples, a user's cable subscription may allow for a certain number of gifts within a certain time period. For example, a cable subscription may allow a user to gift five television shows and two movies to a friend each month. A gift request may include other information.

The server may authenticate the information transmitted in the gift request. In step 804, the server may transmit a confirmation that the gift request and the information in the gift request are valid.

In step 806, the server may grant, to the set-top box, access to the gifted content. In step 808, the set-top box may request playback of the gifted content. In step 810, the server may transmit, to the set-top box, for playback the gifted content.

In one example, the user profile associated with the set-top box may share with another user the gifted content. For example, if the owner of the set-top box goes to a different friend's home, the different friend's set-top box may receive merged permissions and access to content including the gifted content.

Thus, one embodiment may include receiving, by a server, a message from a mobile device including an indication of a computing device requesting a grant of permissions and access for the computing device to at least part of the content associated with a second account, and updating, by the server, the permissions and the access to content associated with a first account to include the at least part of the content associated with the second account.

One or more embodiments may alternatively or additionally include the feature of granting, to the wireless device, permission to remotely control the computing device. For example, a set-top box that detects a device associated with a different user account than the set-top box may, in addition to receiving merged content access rights to the content associated with the user accounts respectively associated with the set-top box and the device may grant the device rights or permissions to act as a remote control device to control the set-top box.

The permission for the device to act as a remote control device to control the set-top box may be limited or restricted to certain features or functions. For example, the device may only have permissions to adjust the volume, brightness, pause, rewind, or fast forward. Alternatively or additionally, the device may be limited to adjusting settings while a display attached to the set-top box is displaying content received through the permissions of the user account associated with the device. Alternatively or additionally, the device may be restricted to acting as a remote control device during the time the device is in the proximity of the set-top box.

Thus, in one embodiment, the permission to remotely control the computing device may be restricted to controlling the computing device while the computing device is accessing the content associated with the second user account.

The sharing of content access and permissions as described herein may be applied to any location that a user visits outside of the user's home. For example, if a user visits a friend's home, a restaurant, a school, a hotel, a resort, an office, a bar, a boat, or another location, the user may receive access at that location to some or all of the content available to the user through the user's subscription. The access to the content may be limited or restricted based on the location (e.g., geographic restrictions), characteristics of the location (e.g., private or public), a subscription of the user or a subscription at the location (e.g., some subscriptions may not be combinable, while others may be combinable in part, while others may be combinable in full), or some other factor.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

It is noted that various connections are set forth between elements in the following description. These connections are described in general and, unless specified otherwise, may be direct or indirect; this specification is not intended to be limiting in this respect.

The invention claimed is:

1. A method comprising:
receiving data indicating rights that permit a mobile device to output one or more content items;
determining, by a first computing device and based on a signal from a second computing device having no rights that permit output of the one or more content items, a proximity of the mobile device to the second computing device; and
granting, by the first computing device to the second computing device and based on the determined proximity, rights that permit the second computing device to output the one or more content items.

2. The method of claim 1, further comprising:
causing, by the first computing device and based on the granting the rights, output of an indication that the one or more content items are viewable via the second computing device.

3. The method of claim 1, further comprising:
receiving, by the first computing device and from the second computing device, a request for a content item of the one or more content items; and
causing, by the first computing device and based on the request and the granting the rights, sending a portion of the content item to the second computing device.

4. The method of claim 1, further comprising:
receiving, by the first computing device and from the second computing device, a request for a recommendation for a content item;
determining, based on the request, a first viewing history of a first user associated with the mobile device and a second viewing history of a second user associated with the second computing device; and
causing, by the first computing device and based on the first viewing history and the second viewing history, sending a response to the request to the second computing device.

5. The method of claim 1, further comprising:
determining a content restriction associated with the mobile device; and
applying, to the second computing device and while the first rights are granted to the second computing device, the content restriction.

6. The method of claim 1, wherein the determining the proximity further comprises receiving, by the first computing device, an indication that the mobile device detected a beacon output by the second computing device.

7. The method of claim 1, further comprising:
based on receiving, by the first computing device, an indication that a threshold period of time has elapsed since the mobile device was within a threshold proximity of the second computing device, causing output of an indication that the second computing device is unable to view the one or more content items.

8. The method of claim 1, further comprising:
based on receiving, by the first computing device, an indication that a threshold period of time has elapsed since the mobile device was within a threshold proximity of the second computing device, revoking the granted rights.

9. The method of claim 1, further comprising:
determining, based on a time associated with the mobile device leaving a threshold proximity of the second computing device, a remaining amount of time that the second computing device will be granted the first rights; and
causing output, via the second computing device, of an indication of the remaining amount of time.

10. The method of claim 1, further comprising:
causing, by the first computing device, the mobile device to output a request for a user of the mobile device to confirm that the one or more content items are shareable with the second computing device.

11. The method of claim 1, further comprising:
receiving, by the first computing device, an indication that the mobile device is within a threshold proximity of a third computing device; and
sending, to the third computing device, a time, in playback of a content item of the one or more content items, corresponding to a most-recent time that the mobile device was within the threshold proximity of the second computing device.

12. The method of claim 1, wherein the data further indicates that the one or more content items can be shared, by the mobile device, based on a determined time period.

13. The method of claim 1, wherein the data further indicates that the one or more content items can be shared, by the mobile device, based on a determined location of the mobile device.

14. The method of claim 1, further comprising:
causing output, via the second computing device and based on the determined proximity, of a code; and
receiving, by the first computing device and from the mobile device, an indication of input of the code via the mobile device, and
wherein the granting is further based on the receiving the indication of the input of the code via the mobile device.

15. An apparatus comprising:
one or more processors; and
memory storing instructions that, when executed by the one or more processors, cause the apparatus to:
receive data indicating, rights that permit a mobile device to output one or more content items;
determine, based on a signal from a second computing device having no rights that permit output of the one or more content items, a proximity of the mobile device to the second computing device; and
grant, to the second computing device and based on the determined proximity, the rights that permit the second computing device to output the one or more content items.

16. The apparatus of claim 15, wherein the instructions, when executed by the one or more processors, cause the apparatus to:
cause, based on the grant of the rights, output of an indication that the one or more content items are viewable via the second computing device.

17. The apparatus of claim 15, wherein the instructions, when executed by the one or more processors, cause the apparatus to:
receive, from the second computing device, a request for a content item of the one or more content items; and
cause, based on the request and based on the grant of the rights, sending a portion of the content item to the second computing device.

18. The apparatus of claim 15, wherein the instructions, when executed by the one or more processors, cause the apparatus to:
receive, from the second computing device, a request for a recommendation for a content item;
determine, based on the request, a first viewing history of a first user associated with the mobile device and a second viewing history of a second user associated with the second computing device; and
cause, based on the first viewing history and the second viewing history, sending a response to the request to the second computing device.

19. The apparatus of claim 15, wherein the instructions, when executed by the one or more processors, cause the apparatus to:
determine a content restriction associated with the mobile device; and
apply, to the second computing device and while the rights are granted to the second computing device, the content restriction.

20. The apparatus of claim 15, wherein the instructions, when executed by the one or more processors, cause the apparatus to:
receive an indication that the mobile device detected a beacon output by the second computing device.

21. The apparatus of claim 15, wherein the instructions, when executed by the one or more processors, cause the apparatus to:
receive an indication that a threshold period of time has elapsed since the mobile device was within a threshold proximity of the second computing device; and
cause output of an indication that the second computing device is unable to view the one or more content items.

22. The apparatus of claim 15, wherein the instructions, when executed by the one or more processors, cause the apparatus to:
receive an indication that a threshold period of time has elapsed since the mobile device was within a threshold proximity of the second computing device; and
revoke the granted rights.

23. The apparatus of claim 15, wherein the instructions, when executed by the one or more processors, cause the apparatus to:
determine, based on a time associated with the mobile device leaving a threshold proximity of the second computing device, a remaining amount of time that the second computing device will be granted the rights; and
cause output, via the second computing device, of an indication of the remaining amount of time.

24. The apparatus of claim 15, wherein the instructions, when executed by the one or more processors, cause the apparatus to:
cause the mobile device to output a request for a user of the mobile device to confirm that the one or more content items are shareable with the second computing device.

25. The apparatus of claim 15, wherein the instructions, when executed by the one or more processors, cause the apparatus to:
receive an indication that the mobile device is within a threshold proximity of a third computing device; and
send, to the third computing device, a time, in playback of a content item of the one or more content items, corresponding to a most-recent time that the mobile device was within the threshold proximity of the second computing device.

26. The apparatus of claim 15, wherein the data further indicates that the one or more first content items can be shared, by the mobile device, based on a determined time period.

27. The apparatus of claim 15, wherein the data further indicates that the one or more content items can be shared, by the mobile device, based on a determined location of the mobile device.

28. The apparatus of claim 15, wherein the instructions, when executed by the one or more processors, cause the apparatus to:
cause output, via the second computing device and based on the determined proximity, of a code; and
receive, from the mobile device, an indication of input of the code via the mobile device, and
wherein the grant is further based on the receiving the indication of the input of the code via the mobile device.

29. A non-transitory computer-readable medium storing instructions that, when executed, cause:
receiving data indicating rights that permit a mobile device to output one or more content items;
determining, by a first computing device and based on a signal from a second computing device having no rights that permit output of the one or more content items, a proximity of the mobile device to the second computing device; and
granting, by the first computing device to the second computing device and based on the determined proximity, the rights that permit the second computing device to output the one or more content items.

30. The non-transitory computer-readable medium of claim 29, wherein the instructions, when executed, further cause:
causing, by the first computing device and based on the granting the rights, output of an indication that the one or more content items are viewable via the second computing device.

31. The non-transitory computer-readable medium of claim 29, wherein the instructions, when executed, further cause:
receiving, by the first computing device and from the second computing device, a request for a content item of the one or more content items; and
causing, by the first computing device and based on the request and the granting the rights, sending a portion of the content item to the second computing device.

32. The non-transitory computer-readable medium of claim 29, wherein the instructions, when executed, further cause:
receiving, by the first computing device and from the second computing device, a request for a recommendation for a content item;
determining, based on the request, a first viewing history of a first user associated with the mobile device and a second viewing history of a second user associated with the second computing device; and
causing, by the first computing device and based on the first viewing history and the second viewing history, sending a response to the request to the second computing device.

33. The non-transitory computer-readable medium of claim 29, wherein the instructions, when executed, further cause:
determining a content restriction associated with the mobile device; and applying, to the second computing device and while the first rights are granted to the second computing device, the content restriction.

34. The non-transitory computer-readable medium of claim 29, wherein the instructions, when executed, further cause:
receiving, by the first computing device, an indication that the mobile device detected a beacon output by the second computing device.

35. The non-transitory computer-readable medium of claim 29, wherein the instructions, when executed, further cause:
receiving, by the first computing device, an indication that a threshold period of time has elapsed since the mobile device was within a threshold proximity of the second computing device; and
causing output of an indication that the second computing device is unable to view the one or more content items.

36. The non-transitory computer-readable medium of claim 29, wherein the instructions, when executed, further cause:
receiving, by the first computing device, an indication that a threshold period of time has elapsed since the mobile device was within a threshold proximity of the second computing device; and
revoking the granted rights.

37. The non-transitory computer-readable medium of claim 29, wherein the instructions, when executed, further cause:
determining, based on a time associated with the mobile device leaving a threshold proximity of the second computing device, a remaining amount of time that the second computing device will be granted the rights; and
causing output, via the second computing device, of an indication of the remaining amount of time.

38. The non-transitory computer-readable medium of claim 29, wherein the instructions, when executed, further cause:
causing, by the first computing device, the mobile device to output a request for a user of the mobile device to confirm that the one or more content items are shareable with the second computing device.

39. The non-transitory computer-readable medium of claim 29, wherein the instructions, when executed, further cause:
receiving, by the first computing device, an indication that the mobile device is within a threshold proximity of a third computing device; and
sending, to the third computing device, a time, in playback of a content item of the one or more content items, corresponding to a most-recent time that the mobile device was within the threshold proximity of the second computing device.

40. The non-transitory computer-readable medium of claim 29, wherein the data further indicates that the one or more content items can be shared, by the mobile device, based on a determined time period.

41. The non-transitory computer-readable medium of claim 29, wherein the data further indicates that the one or more content items can be shared, by the mobile device, based on a determined location of the mobile device.

42. The non-transitory computer-readable medium of claim 29, wherein the instructions, when executed, further cause:
causing output, via the second computing device and based on the determined proximity, of a code; and
receiving, by the first computing device and from the mobile device, an indication of input of the code via the mobile device, and
wherein the granting is further based on the receiving the indication of the input of the code via the mobile device.

43. A system comprising:
a first computing device;
a second computing device; and
a mobile device,
wherein the first computing device comprises:
one or more first processors; and
first memory storing first instructions that, when executed by the one or more first processors, cause the first computing device to:
receive data indicating rights that permit the mobile device to output one or more first content items;
determine, based on a signal from the second computing device, a proximity of the mobile device to the second computing device having no rights that permit output of the one or more content items; and
grant, to the second computing device and based on the determined proximity, the rights that permit the second computing device to output the one or more content items, and
wherein the second computing device comprises:
one or more second processors; and
second memory storing second instructions that, when executed by the one or more second processors, cause the second computing device to:
send the signal to the first computing device.

44. The system of claim 43, wherein the first instructions, when executed by the one or more first processors, cause the first computing device to:
cause, based on the grant of the rights, output of an indication that the one or more content items are viewable via the second computing device.

45. The system of claim 43, wherein the first instructions, when executed by the one or more first processors, cause the first computing device to:
receive, from the second computing device, a request for a content item of the one or more content items; and
cause, based on the request and the grant of the rights, sending a portion of the content item to the second computing device.

46. The system of claim 43, wherein the first instructions, when executed by the one or more first processors, cause the first computing device to:
receive, from the second computing device, a request for a recommendation for a content item;
determine, based on the request, a first viewing history of a first user associated with the mobile device and a second viewing history of a second user associated with the second computing device; and
cause, based on the first viewing history and the second viewing history, sending a response to the request to the second computing device.

47. The system of claim 43, wherein the first instructions, when executed by the one or more first processors, cause the first computing device to:
determine a content restriction associated with the mobile device; and
apply, to the second computing device and while the rights are granted to the second computing device, the content restriction.

48. The system of claim 43, wherein the first instructions, when executed by the one or more first processors, cause the first computing device to:
receive an indication that the mobile device detected a beacon output by the second computing device.

49. The system of claim 43, wherein the first instructions, when executed by the one or more first processors, cause the first computing device to:
receive an indication that a threshold period of time has elapsed since the mobile device was within a threshold proximity of the second computing device; and
cause output of an indication that the second computing device is unable to view the one or more content items.

50. The system of claim 43, wherein the first instructions, when executed by the one or more first processors, cause the first computing device to:
receive an indication that a threshold period of time has elapsed since the mobile device was within a threshold proximity of the second computing device; and
revoke the granted rights.

51. The system of claim 43, wherein the first instructions, when executed by the one or more first processors, cause the first computing device to:
determine, based on a time associated with the mobile device leaving a threshold proximity of the second computing device, a remaining amount of time that the second computing device will be granted the rights; and
cause output, via the second computing device, of an indication of the remaining amount of time.

52. The system of claim 43, wherein the first instructions, when executed by the one or more first processors, cause the first computing device to:
cause the mobile device to output a request for a user of the mobile device to confirm that the one or more content items are shareable with the second computing device.

53. The system of claim 43, wherein the first instructions, when executed by the one or more first processors, cause the first computing device to:
receive an indication that the mobile device is within a threshold proximity of a third computing device; and
send, to the third computing device, a time, in playback of a content item of the one or more content items, corresponding to a most-recent time that the mobile device was within the threshold proximity of the second computing device.

54. The system of claim 43, wherein the data further indicates that the one or more content items can be shared, by the mobile device, based on a determined time period.

55. The system of claim 43, wherein the data further indicates that the one or more content items can be shared, by the mobile device, based on a determined location of the mobile device.

56. The system of claim 43, wherein the first instructions, when executed by the one or more first processors, cause the first computing device to:
cause output, via the second computing device and based on the determined proximity, of a code; and
receive, from the mobile device, an indication of input of the code via the mobile device, and
wherein the grant is further based on the receiving the indication of the input of the code via the mobile device.

* * * * *

UNITED STATES PATENT AND TRADEMARK OFFICE
CERTIFICATE OF CORRECTION

PATENT NO. : 12,041,317 B2  
APPLICATION NO. : 18/176221  
DATED : July 16, 2024  
INVENTOR(S) : Kareeson et al.

Page 1 of 1

It is certified that error appears in the above-identified patent and that said Letters Patent is hereby corrected as shown below:

In the Claims

Column 21, Line 49:
In Claim 5, before "rights", delete "first"

Column 22, Line 5:
In Claim 9, after "the", delete "first"

Column 22, Line 44:
In Claim 15, delete "indicating," and insert --indicating--

Column 24, Line 2:
In Claim 26, after "more", delete "first"

Column 25, Line 2:
In Claim 33, before "rights", delete "first"

Column 26, Line 18:
In Claim 43, after "more", delete "first"

Signed and Sealed this
First Day of July, 2025

Coke Morgan Stewart
*Acting Director of the United States Patent and Trademark Office*